United States Patent
Kito et al.

(10) Patent No.: US 8,279,590 B2
(45) Date of Patent: Oct. 2, 2012

(54) ELECTRONIC APPARATUS AND METHOD FOR PRODUCING AN ELECTRONIC APPARATUS

(75) Inventors: Noriko Kito, Kanagawa (JP); Akira Hanatsuka, Tokyo (JP); Ryosuke Tobiyama, Tokyo (JP); Yu Togasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/639,444

(22) Filed: Dec. 16, 2009

(65) Prior Publication Data

US 2010/0157523 A1    Jun. 24, 2010

(30) Foreign Application Priority Data

Dec. 22, 2008   (JP) .................... 2008-325762

(51) Int. Cl.
  *G06F 1/16*   (2006.01)
  *G06F 3/02*   (2006.01)
(52) U.S. Cl. ......... 361/679.17; 361/679.26; 361/679.55; 345/168
(58) Field of Classification Search ............ 361/679.17, 361/679.01–679.45, 679.55–679.59; 455/575.1; 345/156, 157, 168, 169; 400/682, 82, 691, 400/692, 693, 488, 489; 200/302.1, 345; 341/22
See application file for complete search history.

(56) References Cited

U.S. PATENT DOCUMENTS

| | | | | |
|---|---|---|---|---|
| 5,510,953 | A * | 4/1996 | Merkel | 361/679.08 |
| 6,731,269 | B2 * | 5/2004 | Horiuchi et al. | 345/168 |
| 7,486,501 | B2 | 2/2009 | Hanatsuka et al. | |
| 7,733,636 | B2 * | 6/2010 | Kobayashi et al. | 361/679.08 |
| 7,755,883 | B2 * | 7/2010 | Hsu et al. | 361/679.17 |
| 2002/0080570 | A1 * | 6/2002 | Riddiford | 361/683 |
| 2002/0085338 | A1 * | 7/2002 | Lin | 361/680 |
| 2006/0002065 | A1 * | 1/2006 | Hua | 361/683 |
| 2006/0030214 | A1 * | 2/2006 | Katou et al. | 439/607 |
| 2006/0279912 | A1 * | 12/2006 | Shi et al. | 361/680 |
| 2007/0201194 | A1 * | 8/2007 | Chen et al. | 361/680 |

FOREIGN PATENT DOCUMENTS

JP    2007-305042    11/2007

* cited by examiner

*Primary Examiner* — Jayprakash N Gandhi
*Assistant Examiner* — Nidhi Desai
(74) *Attorney, Agent, or Firm* — Oblon, Spivak, McClelland, Maier & Neustadt, L.L.P.

(57) ABSTRACT

An electronic apparatus includes an accommodation plate, a first exterior member, and a second exterior member. The accommodation plate accommodates a plurality of components except at least a keyboard component. The first exterior member holds the keyboard component and constitutes a first exterior surface of the electronic apparatus. The second exterior member constitutes a second exterior surface as an opposite surface of the first exterior surface. The accommodation plate is disposed between the first exterior member and the second exterior member.

13 Claims, 21 Drawing Sheets

ELECTRONIC APPARATUS AND METHOD FOR PRODUCING AN ELECTRONIC APPARATUS

BACKGROUND OF THE INVENTION

1. Field of the Invention

The present invention relates to an electronic apparatus such as a laptop personal computer and a method of producing an electronic apparatus.

2. Description of the Related Art

From the past, a laptop personal computer includes a main body portion including a keyboard, and a display portion that is openable with respect to the main body portion. The main body portion includes a substrate onto which electronic components are mounted and a bottom and a palm rest that constitute an exterior casing accommodating the substrate. Most of the built-in components such as the substrate are mounted on the bottom side. When the laptop personal computer is produced, the built-in components such as the substrate are mounted on the bottom side and the keyboard and the like are screwed from an exterior side of the bottom so as to cover the built-in components (see Japanese Patent Application Laid-open No. 2007-305042 (FIGS. 13 and 16), for example).

SUMMARY OF THE INVENTION

However, in the technique described above, a plurality of bosses and ribs are formed on the bottom in order to incorporate the components including the substrate in the bottom and the substrate is screwed from the exterior side of the bottom, thus resulting in a problem that screws are seen from the bottom side and design becomes poor.

In view of the circumstances as described above, there is a need for an electronic apparatus excellent in design of an exterior surface and a method of producing the electronic apparatus.

According to an embodiment of the present invention, there is provided an electronic apparatus including an accommodation plate, a first exterior member, and a second exterior member. The accommodation plate accommodates a plurality of components except at least a keyboard component. The first exterior member holds the keyboard component and constitutes a first exterior surface of the electronic apparatus. The second exterior member constitutes a second exterior surface as an opposite surface of the first exterior surface. The accommodation plate is disposed between the first exterior member and the second exterior member.

In the embodiment of the present invention, since the accommodation plate that integrally accommodates the plurality of components except at least the keyboard component is provided, it is unnecessary to dispose the plurality of components on the second exterior member. Accordingly, it is unnecessary to form connection portions for disposing the plurality of components on the second exterior member. As a result, the design of the exterior surface of the second exterior member can be improved.

The accommodation plate may have a planar shape corresponding to the first exterior member. Accordingly, rigidity of the keyboard component can be improved.

The keyboard component may include a first surface that is opposed to the accommodation plate and a first engagement portion that is provided on the first surface, and the accommodation plate may include a second surface that is opposed to the first surface of the keyboard component and a second engagement portion that is provided on the second surface and engaged with the first engagement portion when the keyboard component is caused to slide along the second surface of the accommodation plate. Accordingly, by causing the keyboard component to slide with respect to the accommodation plate, the first engagement portion is engaged with the second engagement portion and thus the accommodation plate and the keyboard component can be combined.

The plurality of components may include a heat-generating component, and the electronic apparatus may further include a heat dissipation mechanism including a heat transfer component that is brought into contact with the heat-generating component and the accommodation plate. Accordingly, heat of the heat-generating component can be effectively dissipated using the heat dissipation mechanism and the accommodation plate.

The electronic apparatus may further include a first hole that is provided to the first exterior member and connects to the accommodation plate, a second hole that is provided to the accommodation plate and corresponds to the first hole, a screw that is inserted into the first hole and the second hole from the first hole side and is screwed with a head end being positioned at a deeper position than an end of the first hole so that the first exterior member and the accommodation plate are coupled to each other, and a blindfold member that is buried between the end of the first hole and the head end of the screw. Accordingly, the screw is inserted into the first hole and the second hole and is screwed, the first exterior member side and the second exterior member side are coupled, the screw is hidden with the blindfold member, and design can be improved.

According to another embodiment of the present invention, there is provided a method of producing an electronic apparatus, including incorporating a plurality of components except at least a keyboard component in an accommodation plate. A first exterior member that constitutes a first exterior surface of the electronic apparatus and a second exterior member that constitutes a second exterior surface as an opposite surface of the first exterior surface are prepared. The keyboard component is incorporated in the first exterior member. The accommodation plate in which the plurality of components are incorporated and the second exterior member are coupled to each other. The first exterior member and the second exterior member are coupled to each other with the accommodation plate being disposed between the first exterior member and the second exterior member.

In the embodiment of the present invention, since the accommodation plate that integrally accommodates the plurality of components except at least the keyboard component is provided, it is unnecessary to dispose the plurality of components on the second exterior member. Accordingly, it is unnecessary to form connection portions for disposing the plurality of components on the second exterior member. As a result, the design of the exterior surface of the second exterior member can be improved.

As described above, according to the embodiments of the present invention, it is possible to provide an electronic apparatus excellent in design of an exterior surface.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

In this embodiment, a laptop personal computer will be taken as an example of an electronic apparatus.

(Structure of Electronic Apparatus)

Figure 1:
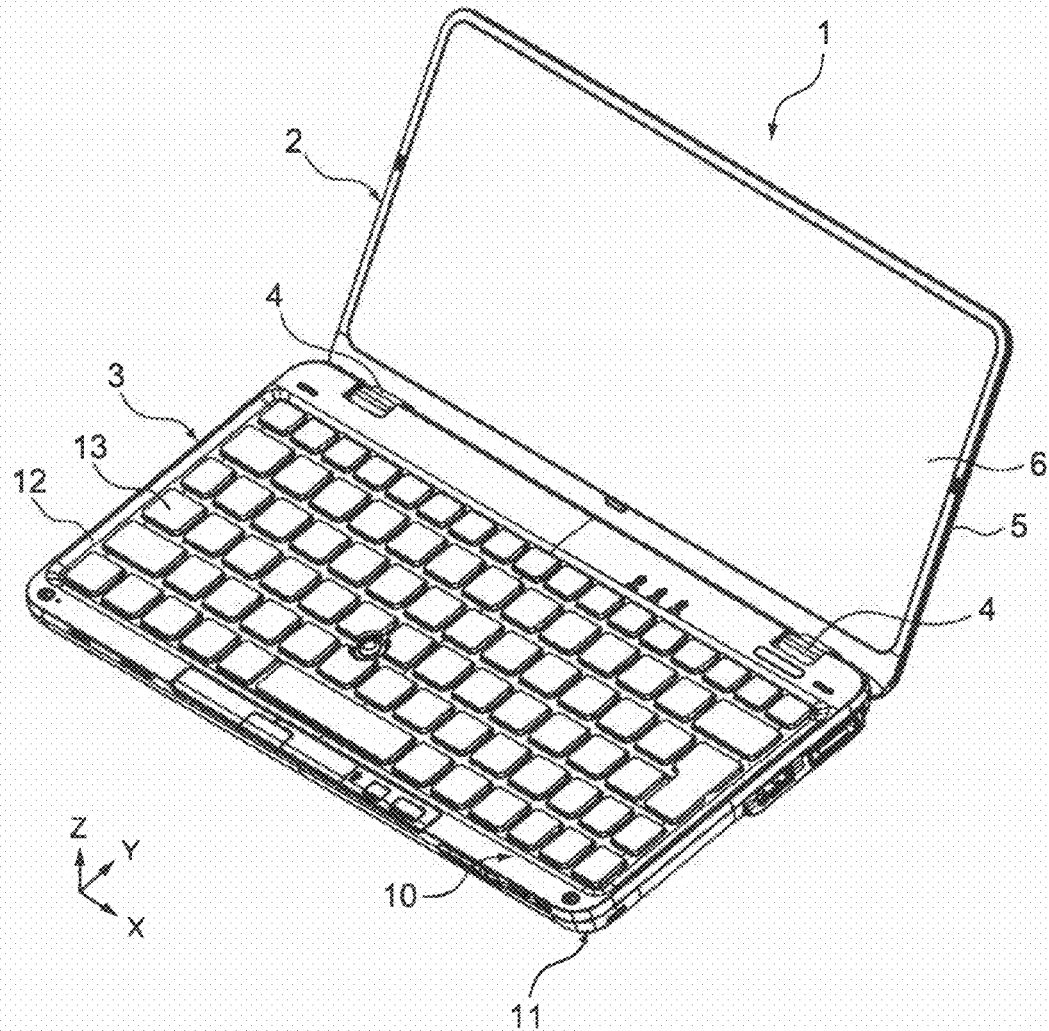
FIG. 1 is a perspective view of an electronic apparatus according to an embodiment of the present invention in an open state.

FIG. 1 is a perspective view of an electronic apparatus according to an embodiment of the present invention in an open state.

An electronic apparatus 1 includes a display portion 2, a main body portion 3, and hinges 4 that couple the display portion 2 and the main body portion 3.

The display portion 2 is openable with respect to the main body portion 3 via the hinges 4. The display portion 2 includes a display-side casing 5, a display screen 6, and a display processing unit (not shown) that is provided inside the display-side casing 5 and performs display processing.

The display-side casing 5 is a casing of the display portion 2 and accommodates the display processing unit (not shown). The display screen 6 is a screen for displaying information and faces the main body portion 3 in a closed state. Two hinges 4 are attached to the display-side casing 5. The display portion 2 is rotatably provided to the main body portion 3 by those hinges 4.

(Structure of Main Body Portion 3)

Figure 2:
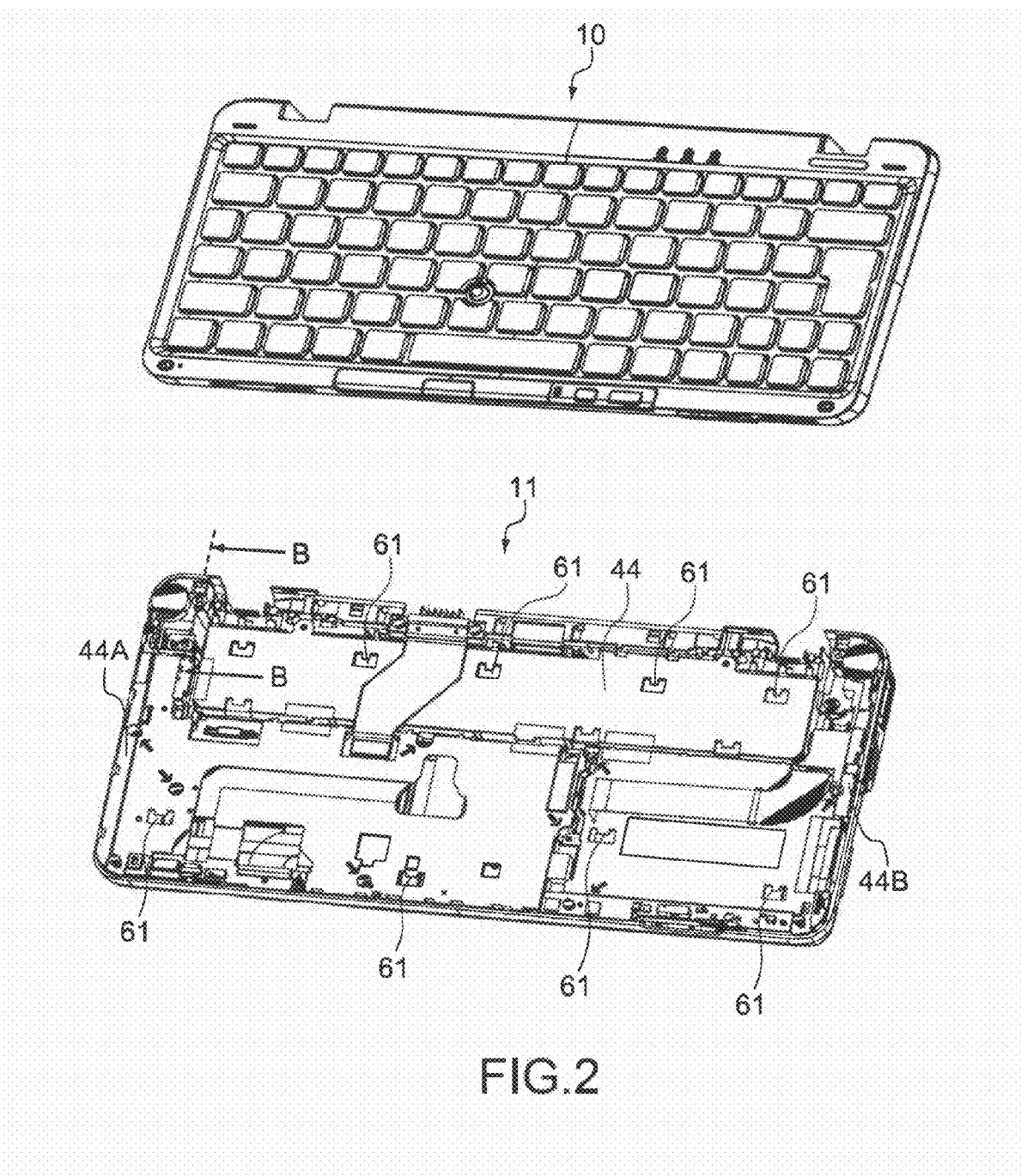
FIG. 2 is an exploded perspective view of a main body portion of the electronic apparatus shown in FIG. 1.

FIG. 2 is an exploded perspective view of the main body portion 3 of the electronic apparatus 1 shown in FIG. 1.

The main body portion 3 includes a palm rest unit 10 (keyboard unit) constituting an upper surface side portion of the main body portion 3 and a main body unit 11 constituting a bottom surface side portion of the main body portion 3 (see FIG. 1). The main body portion 3 is obtained by integrating the palm rest unit 10 and the main body unit 11 as described later. The palm rest unit 10 and the main body unit 11 are each constituted of a plurality of members, but there are formed no visible screws and the like on exterior surfaces.

Figure 3:
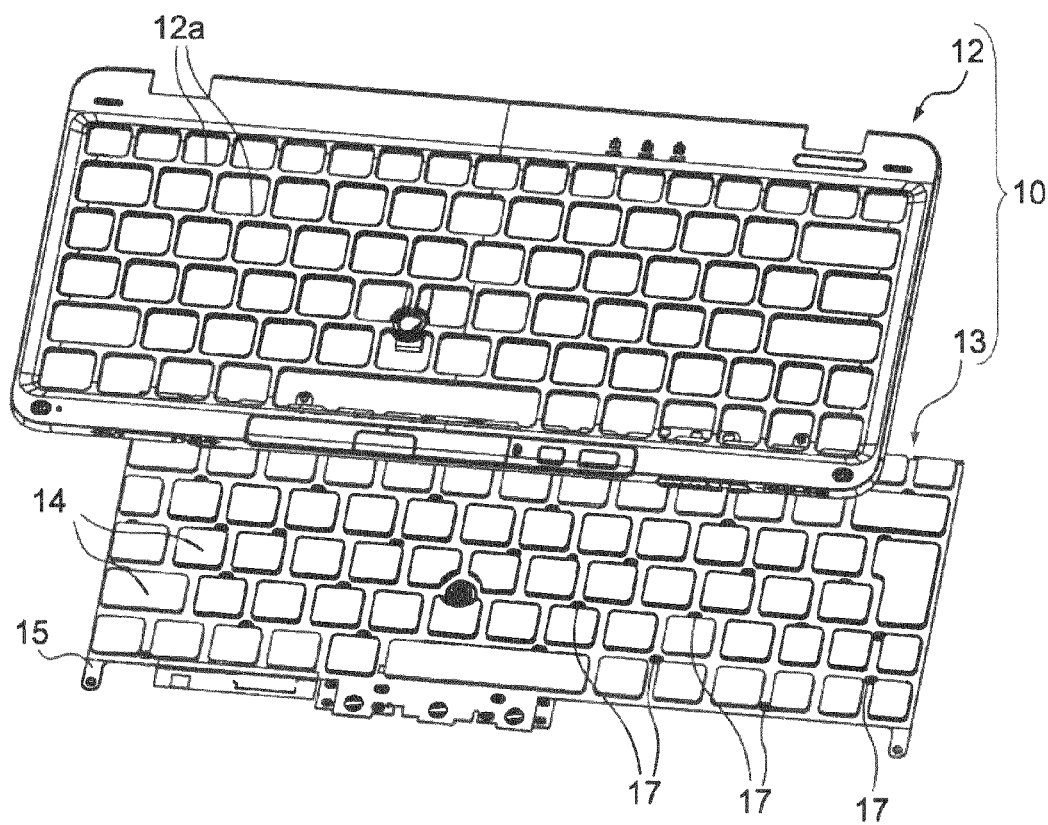
FIG. 3 is an exploded perspective view of a palm rest unit shown in FIG. 2.

FIG. 3 is an exploded perspective view of the palm rest unit 10 shown in FIG. 2.

The palm rest unit 10 includes a palm rest 12 as a first exterior member and a keyboard 13.

The palm rest 12 is a rectangular plate-like exterior member and forms an exterior surface of the main body portion 3. The palm rest 12 is formed with a plurality of through-holes 12a into which keys 14 of the keyboard 13 are inserted. In other words, those through-holes 12a are formed at positions corresponding to positions of the respective keys 14. For a constituent material of the palm rest 12, for example, aluminum is used.

The keyboard 13 functions as an input portion of the electronic apparatus 1 and incorporates a sheet switch (not shown) made of, for example, PET or the like. The keyboard 13 includes the plurality of keys 14 on an upper surface side thereof and a support plate 15 on a bottom surface side thereof.

The support plate 15 is a plate-like member provided on the bottom surface side of the keyboard 13. On the upper surface side of the keyboard 13, a plurality of holes 17 are formed between the keys 14. The plurality of holes 17 are formed at positions corresponding to those of a plurality of weld pins (not shown) that are formed on a back surface of the palm rest 12 (surface side not seen in FIG. 3). The weld pins (not shown) of the palm rest 12 are inserted into the holes 17 of the keyboard 13 and then welded, and thus the palm rest 12 and the keyboard 13 are welded.

Figure 4:
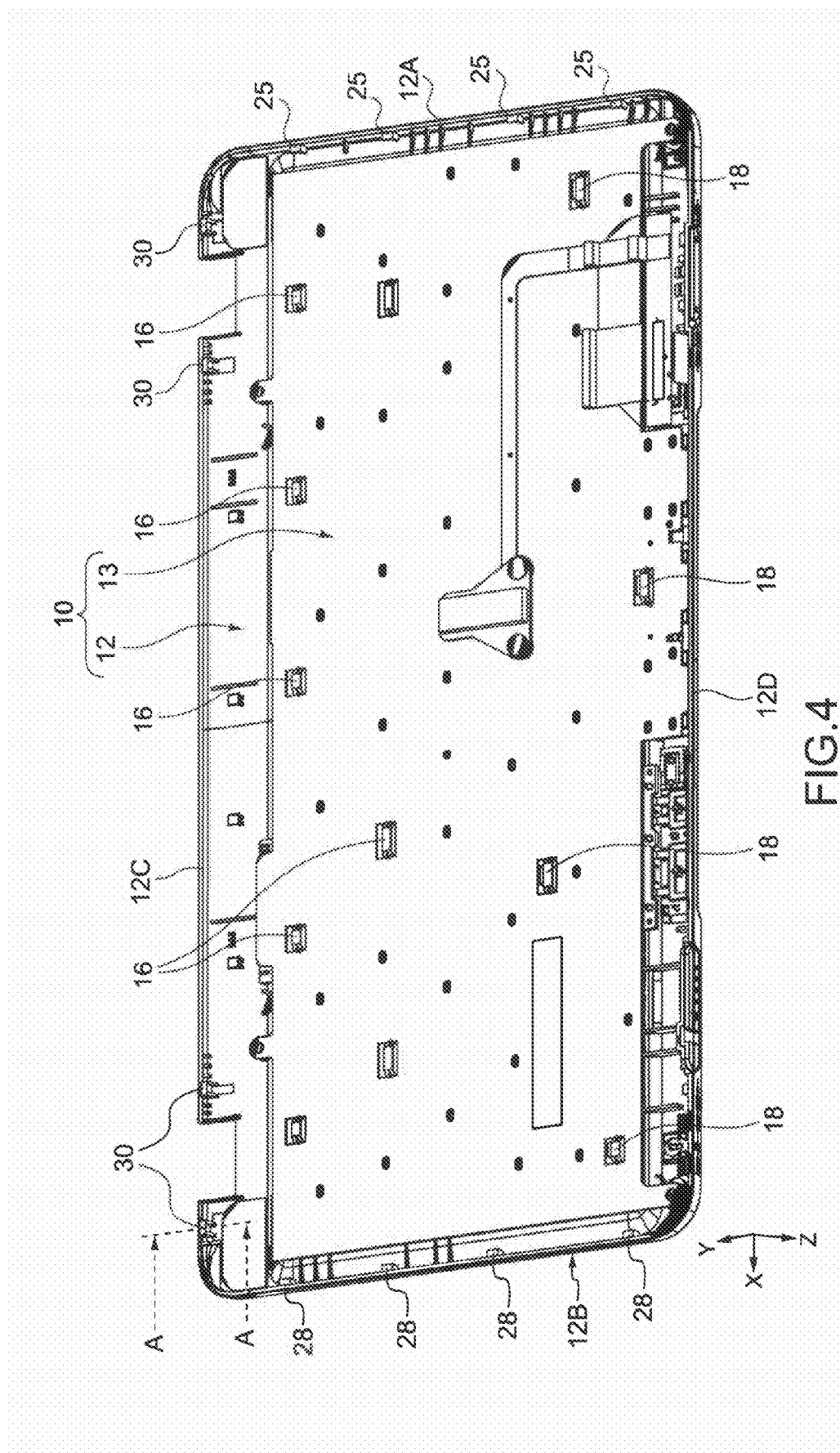
FIG. 4 is a perspective view of the palm rest unit shown in FIG. 2 seen from a bottom surface side.

FIG. 4 is a perspective view of the palm rest unit 10 shown in FIG. 2 seen from a bottom surface side.

The keyboard 13 of the palm rest unit 10 includes the support plate 15 on the bottom surface side thereof. When the palm rest unit 10 is seen from the bottom surface side, an outer circumferential portion of the palm rest 12 is exposed on a circumference of the support plate 15. The support plate 15 is formed with a plurality of engagement protrusions 16 and 18. The engagement protrusions 16 and the engagement protrusions 18 are plurally provided at predetermined positions while being distributed on the entire area of the support plate 15. The predetermined positions can be changed as appropriate in accordance with a size and the like of the keyboard 13.

The palm rest 12 includes side walls 12A, 12B, 12C, and 12D that are provided so as to stand on the outer circumference. The side wall 12A is a side wall extending in a Y direction along a shorter outer edge side of the palm rest 12. The side wall 12B is a side wall extending in the Y direction so as to face the side wall 12A. The side wall 12C is a side wall extending in an X direction orthogonal to the side walls 12A and 12B. The side wall 12C is a side wall provided on one side of the palm rest 12 in the Y direction, on which the hinges 4 are arranged. The side wall 12D is a side wall extending in the X direction so as to face the side wall 12C.

Figure 5:
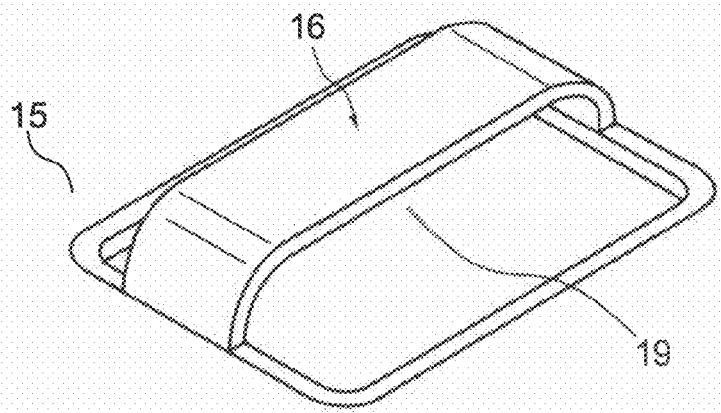
FIG. 5 is an enlarged perspective view of an engagement protrusion that is formed on a support plate of a keyboard shown in FIG. 4.

FIG. 5 is an enlarged perspective view of the engagement protrusion 16 that is formed on the support plate 15 of the keyboard 13 shown in FIG. 4.

The engagement protrusion 16 has a flattened, substantially U-shape and is provided while protruding outwardly from a surface of the support plate 15. The engagement protrusion 16 is formed with an engagement hole 19 that penetrates in a direction orthogonal to a longitudinal direction of the keyboard 13 (Y direction in FIG. 4).

Figure 6:
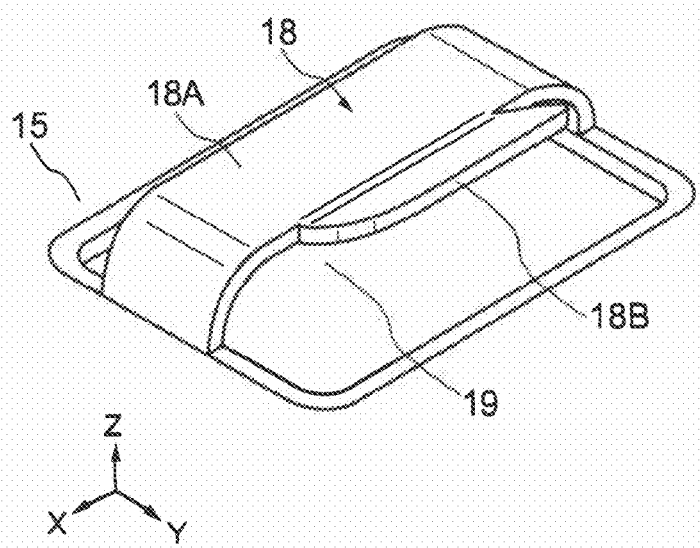
FIG. 6 is an enlarged perspective view of an engagement protrusion that is formed on the support plate of the keyboard shown in FIG. 4.

FIG. 6 is an enlarged perspective view of the engagement protrusion 18 that is formed on the support plate 15 of the keyboard 13 shown in FIG. 4.

The engagement protrusion 18 includes a protrusion 18A having a flattened, substantially U-shape as in the case of the engagement protrusion 16 and an overhang 18B extending from the protrusion 18A. The overhang 18B protrudes toward the direction orthogonal to the longitudinal direction of the keyboard 13 (Y direction in FIG. 4). The overhang 18B is provided while being tilted with respect to the bottom surface of the keyboard 13. In other words, the overhang 18B is provided obliquely so as to be away from the support plate 15 as a distance from the overhang 18A is increasing in a direction parallel to the support plate 15 (Y direction in FIG. 6).

Figure 7:
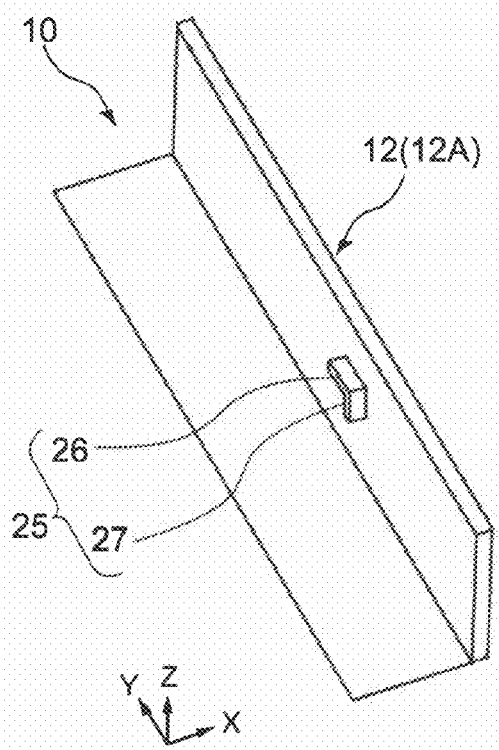
FIG. 7 is an enlarged perspective view of the vicinity of an end edge on the right-hand side of a palm rest shown in FIG. 4.

FIG. 7 is an enlarged perspective view of the vicinity of an end edge on the right-hand side of the palm rest 12 shown in FIG. 4.

On an inner surface of the side wall 12A of the palm rest 12, there are formed a plurality of engagement portions 25 at predetermined intervals in a longitudinal direction of the side wall 12A (Y direction in FIG. 4). The engagement portions 25 are provided while protruding from the inner wall of the side wall 12A. Each of the engagement portions 25 includes a first wall portion 26 and a second wall portion 27 that is orthogonally continuous with the first wall portion 26.

The first wall portion 26 extends in parallel with a direction orthogonal to a longitudinal direction of the palm rest unit 10 (Y direction in FIGS. 4 and 7). The first wall portion 26 guides the palm rest unit 10 in a predetermined direction (Y direction in FIG. 7) with respect to the main body unit 11 at a time of combining them, which will be described later. The second wall portion 27 regulates slide at a time of production of the palm rest unit 10, which will be described later. It should be noted that on an inner surface of the side wall 12B that is opposed to the side wall 12A of the palm rest 12, a plurality of engagement portions 28 having the same shape as that of the plurality of engagement portions 25 are formed symmetrically with the engagement portions 25 (see FIG. 4).

Figure 8:
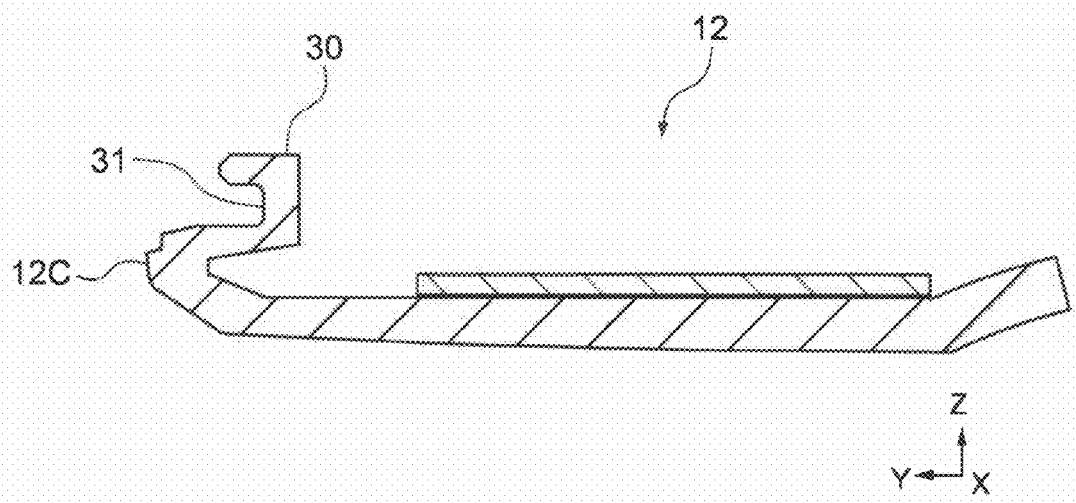
FIG. 8 is a cross-sectional view taken along the line A-A of the palm rest shown in FIG. 4.

FIG. 8 is a cross-sectional view taken along the line A-A of the palm rest 12 shown in FIG. 4.

Formed on the side wall 12C of the palm rest 12 are engagement portions 30. Each of the engagement portions 30 includes a concave portion 31. A concave direction of the concave portion 31 is the Y direction orthogonal to the longitudinal direction of the palm rest 12. The concave portion 31 includes a claw portion 34 that protrudes outwardly of the palm rest 12 in the Y direction orthogonal to the longitudinal direction of the palm rest 12. The engagement portion 30 is provided inwardly of the side wall 12C so as not to stick out from the side wall 12C. The engagement portion 30 is used for fixing the palm rest unit 10 to the main body unit 11 while combining them. An engagement operation of the engagement portion 30 will be described later.

(Detailed Structure of Main Body Portion 3)

Figure 9:
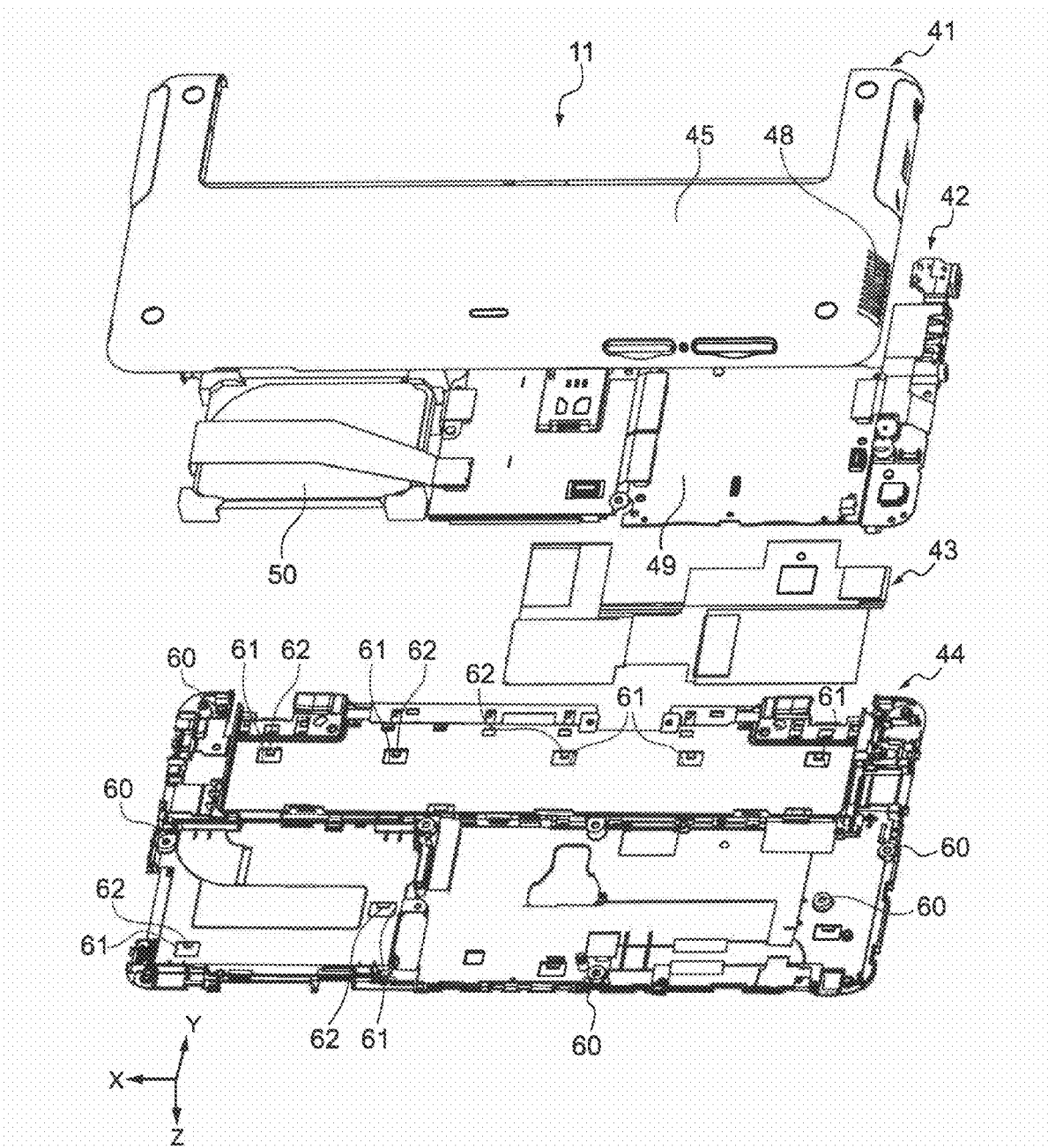
FIG. 9 is an exploded perspective view of a main body unit shown in FIG. 2.

FIG. 9 is an exploded perspective view of the main body unit 11 shown in FIG. 2.

The main body unit 11 includes a bottom 41 as a second exterior member, a printed board 42 onto which a plurality of electronic components etc. are mounted, a heat dissipation unit 43, and a frame palm rest 44. It should be noted that illustration of a battery unit etc. is omitted.

As shown in FIG. 9, the bottom 41 forms an exterior surface 45 serving as an opposite surface of the exterior surface of the palm rest 12. The bottom 41 has a shape capable of accommodating the printed board 42, the heat dissipation unit 43, and the frame palm rest 44. The exterior surface 45 of the bottom 41 is not formed with screw holes and the like and smoothly curved at circumferences, thus being excellent in design as in a case of an exterior surface of the display portion 2.

Figure 10:
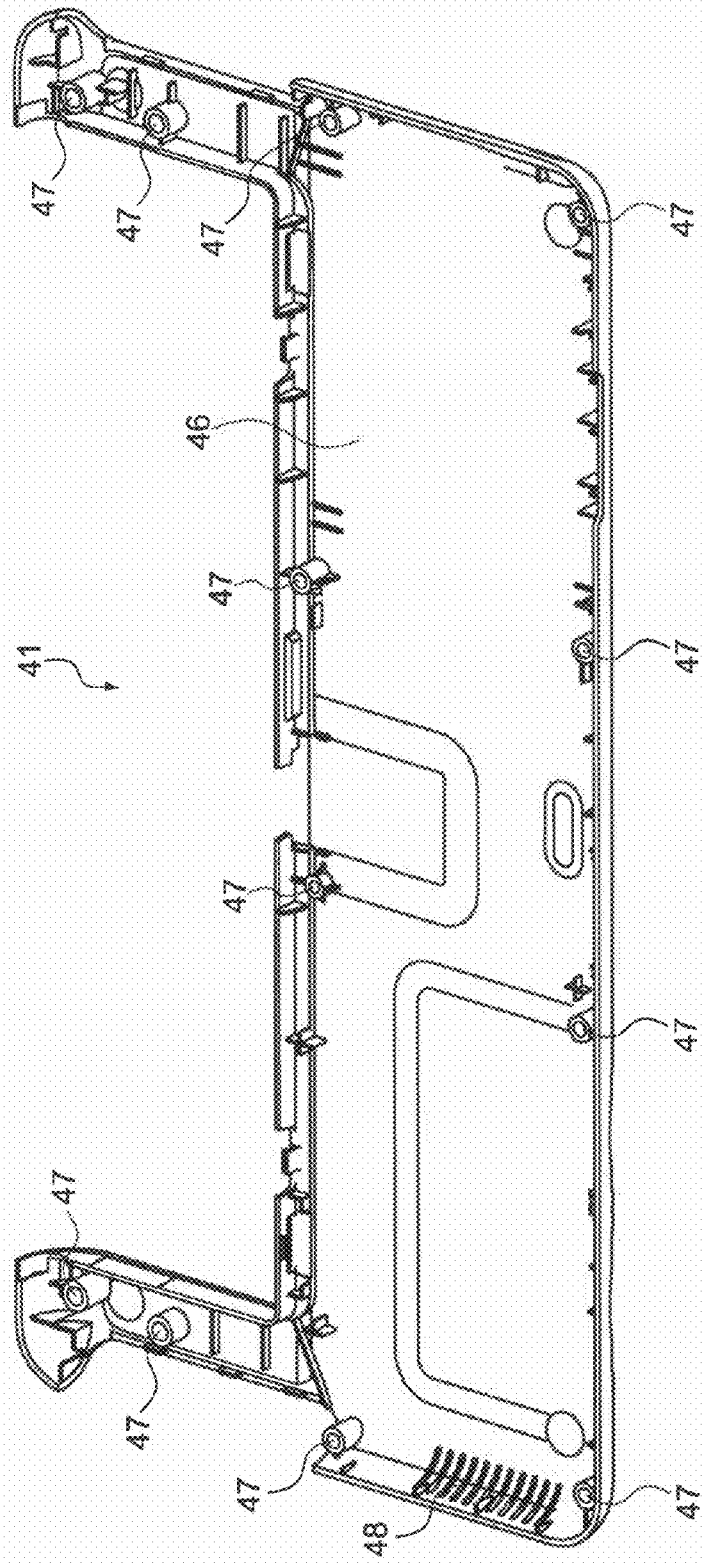
FIG. 10 is a perspective view of a bottom shown in FIG. 9 seen from an inner surface side opposite to an exterior surface.

FIG. 10 is a perspective view of the bottom 41 shown in FIG. 9 seen from an inner surface side that is opposite to the exterior surface 45.

As shown in FIG. 10, a plurality of bosses 47 are formed on an inner surface 46 side of the bottom 41 in the vicinity of an area close to an end edge of the bottom 41. The bosses 47 are used for fixing the frame palm rest 44 to the bottom 41.

The bosses 47 are not formed except the vicinity of the end edge on the inner surface 46 of the bottom 41. As a result, sinks generated due to formation of the bosses 47 are not formed on the exterior surface 45 of the bottom 41. The sinks are concave marks that impair quality in appearance of the bottom 41, the sinks being generated, for example, in the course during which solidification of a resin advances from the outer surface of the bottom 41 when the bottom 41 is molded, because the resin positioned on the surface of the bottom 41 is pulled by a contraction force due to a volume contraction of the inner resin of a molten state. The bottom 41 is formed with a through-hole 48 that penetrates from the inner surface 46 of the bottom 41 to the exterior surface 45. The through-hole 48 is a vent for dissipating heat inside the main body portion 3 to the outside, for example.

The printed board 42 includes a board 49 onto which a plurality of electronic components such as a CPU (Central Processing Unit) and a memory are mounted and a hard disk drive 50 connected to the board 49 as shown in FIG. 9. The heat dissipation unit 43 includes a heat pipe, for example, but does not include a fan.

The frame palm rest 44 has a planar shape corresponding to the shape of the main body portion 3 and is substantially rectangular as shown in FIG. 9. The frame palm rest 44 has higher bending rigidity than the bottom 41 and the palm rest 12. For a constituent material of the frame palm rest 44, for example, a magnesium alloy is used, but the material is not limited thereto. For example, a different metal material can be used.

The frame palm rest 44 is formed with a plurality of bosses 60 and guide grooves for mounting components such as the heat dissipation unit 43 and the printed board 42 that are incorporated in the main body portion 3. The frame palm rest 44 is formed with a plurality of engagement holes 61 as shown in FIG. 9. The engagement holes 61 are engaged with the engagement protrusions 16 and 18 of the palm rest unit 10 shown in FIG. 4. Each of the engagement holes 61 includes a claw portion 62 that protrudes from an edge of the engagement hole 61. The protrusion direction of the claw portion 62 is an opposite direction of a direction in which the palm rest unit 10 is caused to slide with respect to the main body unit 11 (negative direction of Y direction in FIG. 9).

Figure 11:
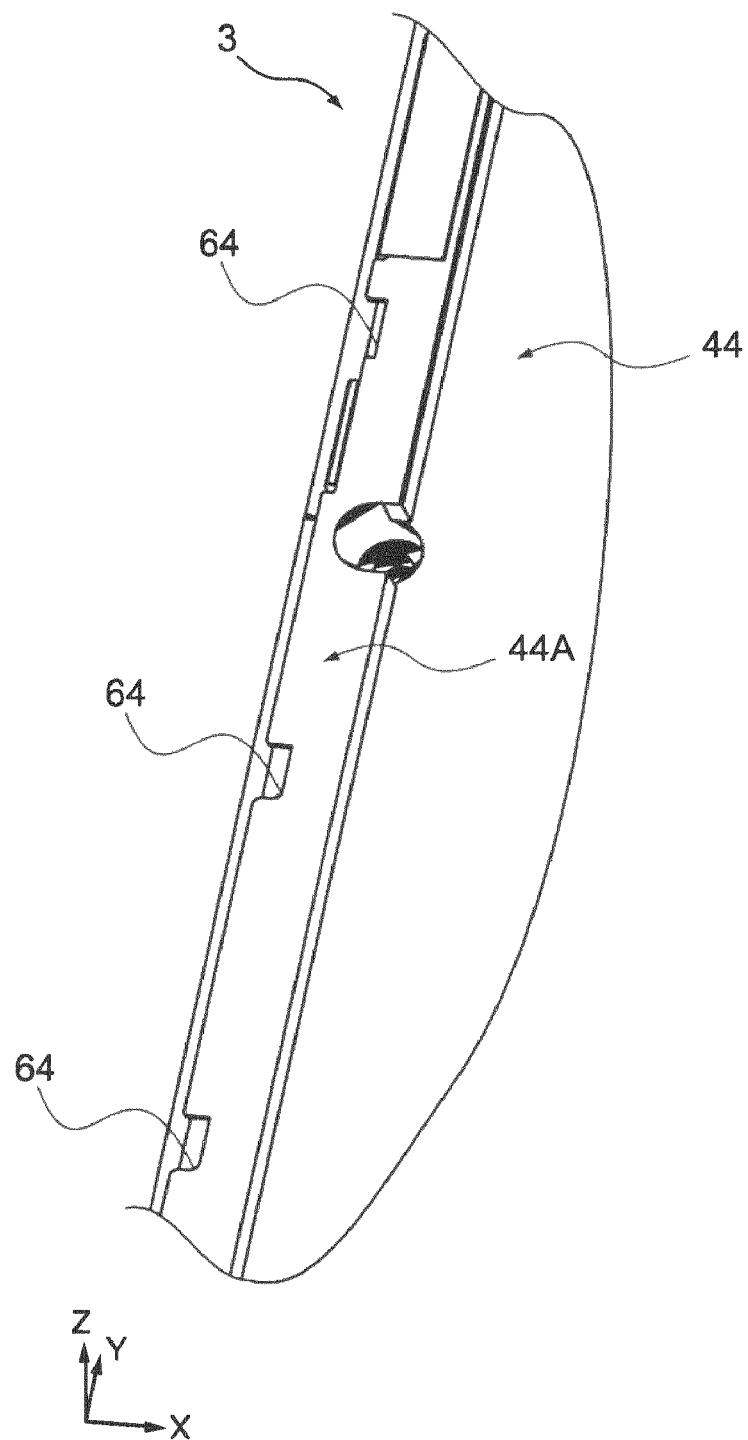
FIG. 11 is a partially-enlarged perspective view of the vicinity of a side end on the left-hand side of the main body unit shown in FIG. 2.

FIG. 11 is a partially-enlarged perspective view of the vicinity of a side end on the left-hand side of the main body unit 11 shown in FIG. 2.

The frame palm rest 44 is formed with engagement holes 64 at a side end portion 44A (left-hand side) at predetermined intervals in the Y direction. The engagement holes 64 engage with the engagement portions 25 of the palm rest unit 10 shown in FIG. 4 when the palm rest unit 10 and the main body unit 11 are combined. The shape of the engagement holes 64 is, for example, substantially concave.

Figure 12:
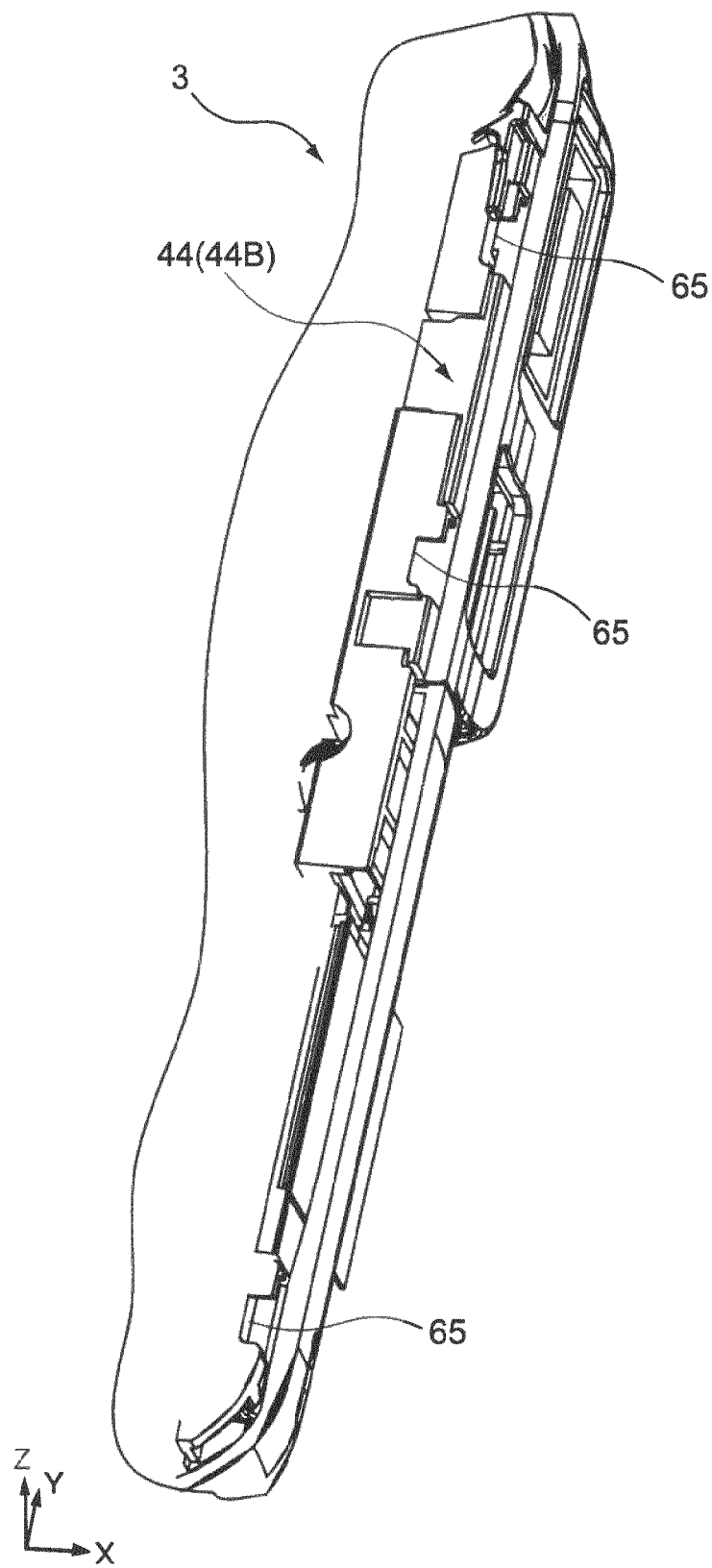
FIG. 12 is a partially-enlarged perspective view of the vicinity of a side end on the right-hand side of the main body unit shown in FIG. 2.

FIG. 12 is a partially-enlarged perspective view of the vicinity of a side end on the right-hand side of the main body unit 11 shown in FIG. 2.

The frame palm rest 44 includes a side end portion 44B at a side end opposite to the side end portion 44A. The frame palm rest 44 is formed with engagement holes 65 at predetermined intervals in the Y direction at the side end portion 44B on the other side (right-hand side) of the frame palm rest 44. The engagement holes 65 engage with the engagement portions 28 of the palm rest unit 10 shown in FIG. 4 when the palm rest unit 10 and the main body unit 11 are combined. The shape of the engagement holes 65 is, for example, substantially concave. That is, the engagement holes 65 have a shape symmetrical to the engagement holes 64.

Figure 13:
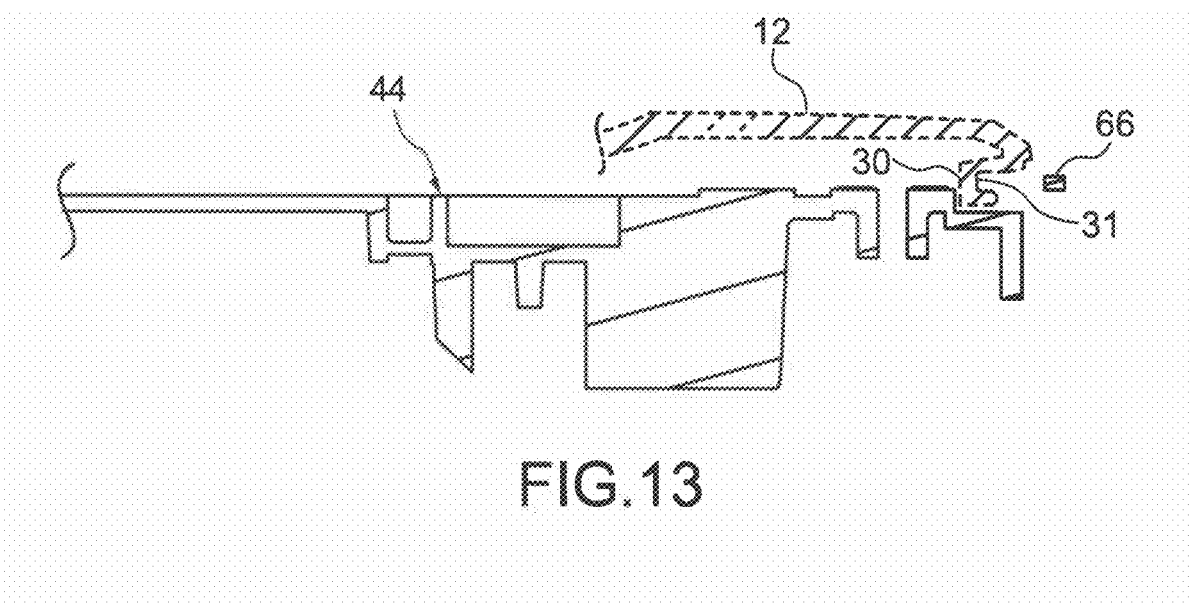
FIG. 13 is a cross-sectional view taken along the line B-B of a frame palm rest shown in FIG. 2.

FIG. 13 is a cross-sectional view taken along the line B-B of the frame palm rest 44 shown in FIG. 2.

The frame palm rest 44 includes engagement claws 66 that engage with the engagement portions 30 of the palm rest 12. Each of the engagement claws 66 has a substantially-rectangular cross section that fits into the concave portion 31 of the engagement portion 30 of the palm rest 12.

Figure 14:
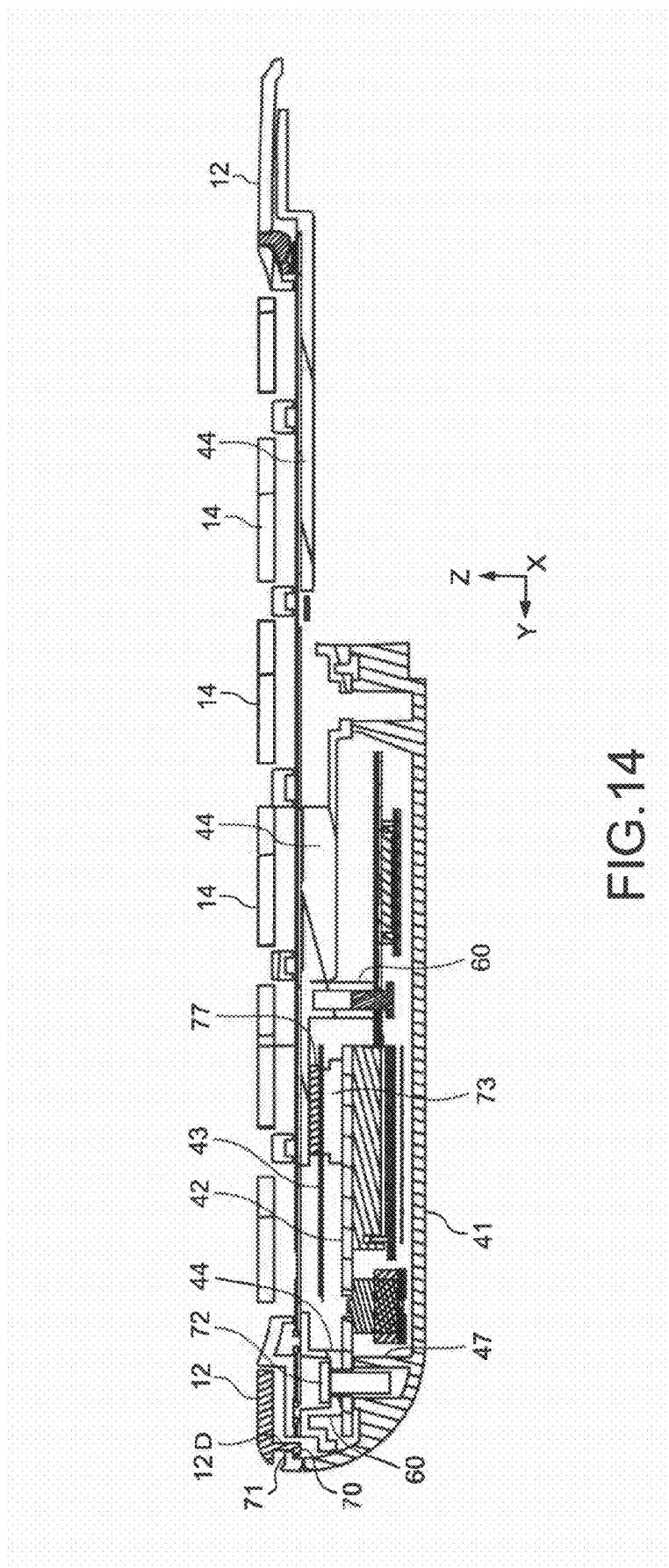
FIG. 14 is a lateral cross-sectional view of the main body portion shown in FIG. 1.

FIG. 14 is a lateral cross-sectional view of the main body portion 3 shown in FIG. 1.

The side wall 12D of the palm rest 12 is formed with an engagement protrusion 70 that protrudes outwardly of the palm rest 12 from the side wall 12D. A direction in which the engagement protrusion 70 protrudes is a Y direction orthogonal to a longitudinal direction (X direction in FIG. 14) of the frame palm rest 44, for example.

The frame palm rest 44 is formed with an engagement claw 71 that engages with the engagement protrusion 70. A direction in which the engagement claw 71 protrudes is a direction orthogonal to the longitudinal direction of the frame palm rest 44 (Y direction in FIG. 14). An orientation in which the engagement claw 71 protrudes is an opposite orientation of an orientation in which the engagement protrusion 70 protrudes.

The frame palm rest 44 integrally accommodates a plurality of components except at least the keyboard 13 out of the plurality of components constituting the electronic apparatus 1. For example, the printed board 42 is fixed to the frame palm rest 44 with a screw 72. An electronic component 73 and the like are mounted onto the printed board 42. The heat dissipation unit 43 is connected to the frame palm rest 44 via a conductive adhesive member 77. The electronic component 73 is brought into contact with the heat dissipation unit 43.

(Method of Producing Electronic Apparatus 1)

Figure 15:
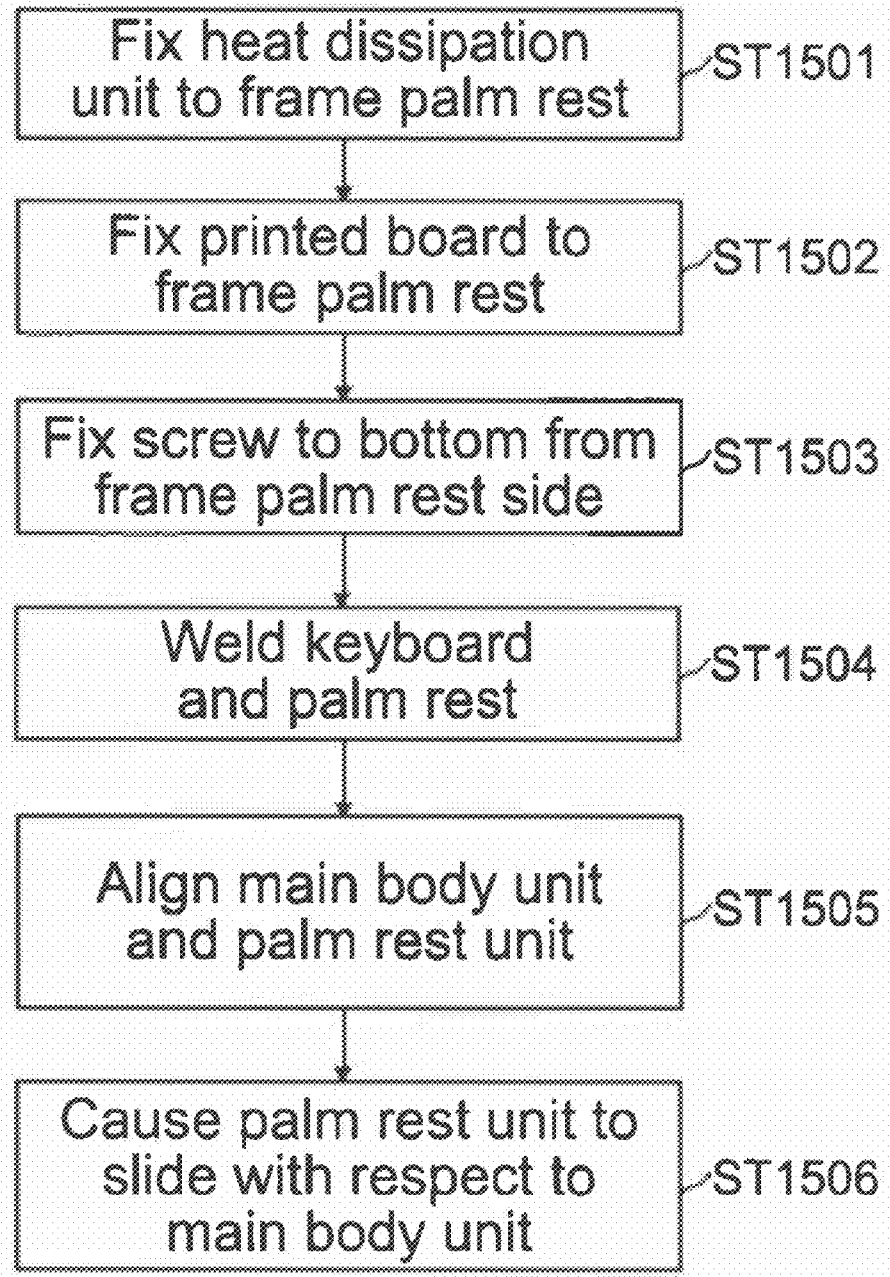
FIG. 15 is a flowchart showing a production process of the electronic apparatus.
Figure 16:
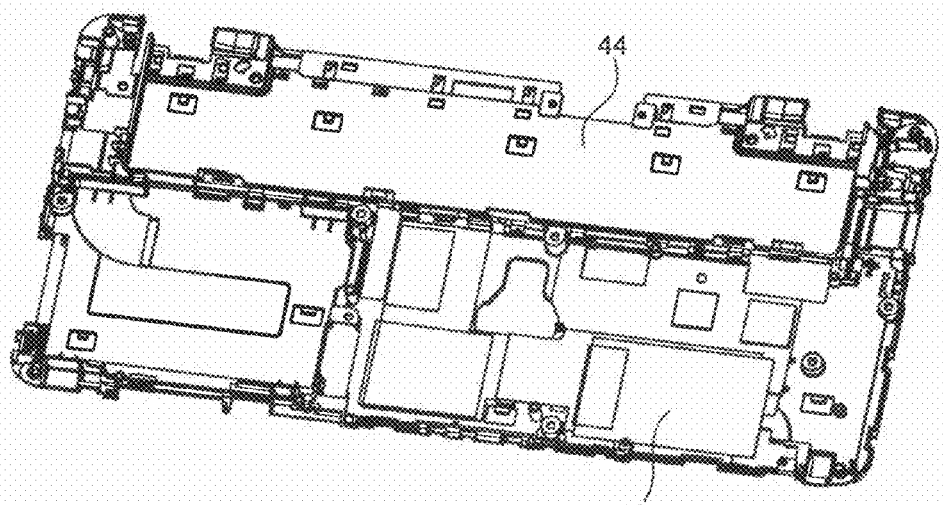
FIG. 16 is a perspective view showing a state in which a heat dissipation unit is mounted onto the frame palm rest.

FIG. 15 is a flowchart showing a production process of the electronic apparatus 1. It should be noted that in this embodiment, a production process of the main body portion 3 will be focused. FIG. 16 is a perspective view showing a state in which the heat dissipation unit 43 is mounted onto the frame palm rest 44, FIG. 17 is a perspective view showing a state in which the printed board 42 is aligned with the frame palm rest 44, FIG. 18 is a perspective view showing a state in which the bottom 41 is aligned with the frame palm rest 44, and FIG. 19 is a perspective view showing a state in which the display portion 2 is coupled to the main body unit 11.

First, as shown in FIG. 16, the heat dissipation unit 43 is mounted at a predetermined position of the frame palm rest 44 (ST1501).

Figure 17:
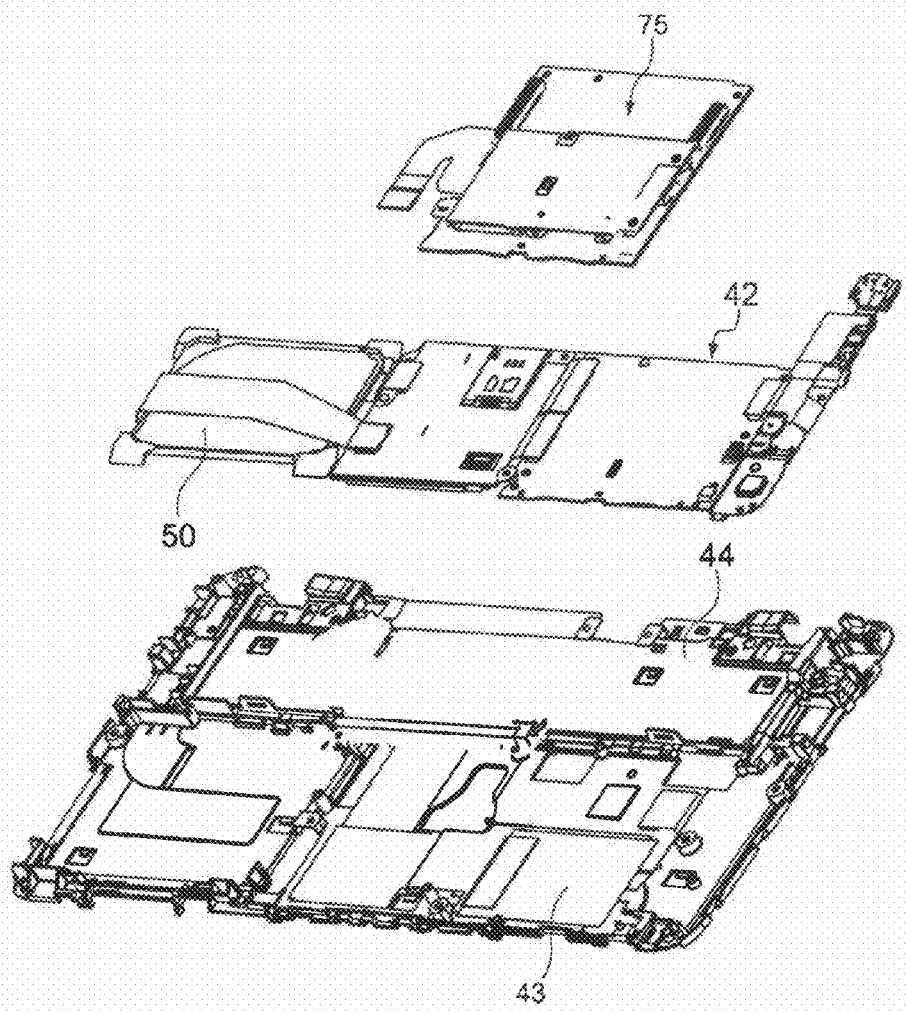
FIG. 17 is a perspective view showing a state in which a printed board is aligned with the frame palm rest.

Next, as shown in FIG. 17, the printed board 42, a board 75, and the like are aligned with the frame palm rest 44 and fixed with screws or the like (ST1502).

Figure 18:
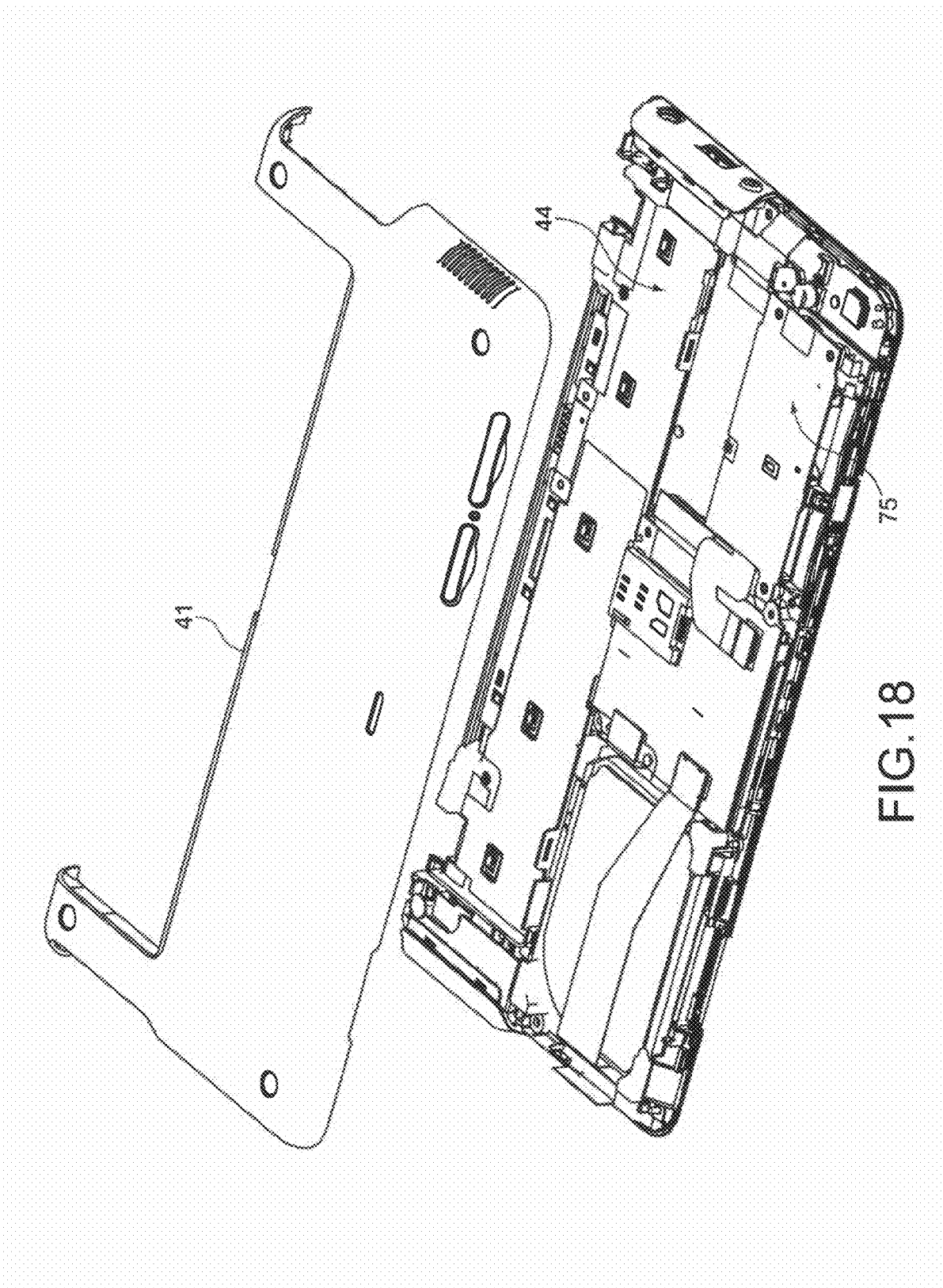
FIG. 18 is a perspective view showing a state in which the bottom is aligned with the frame palm rest.
Figure 19:
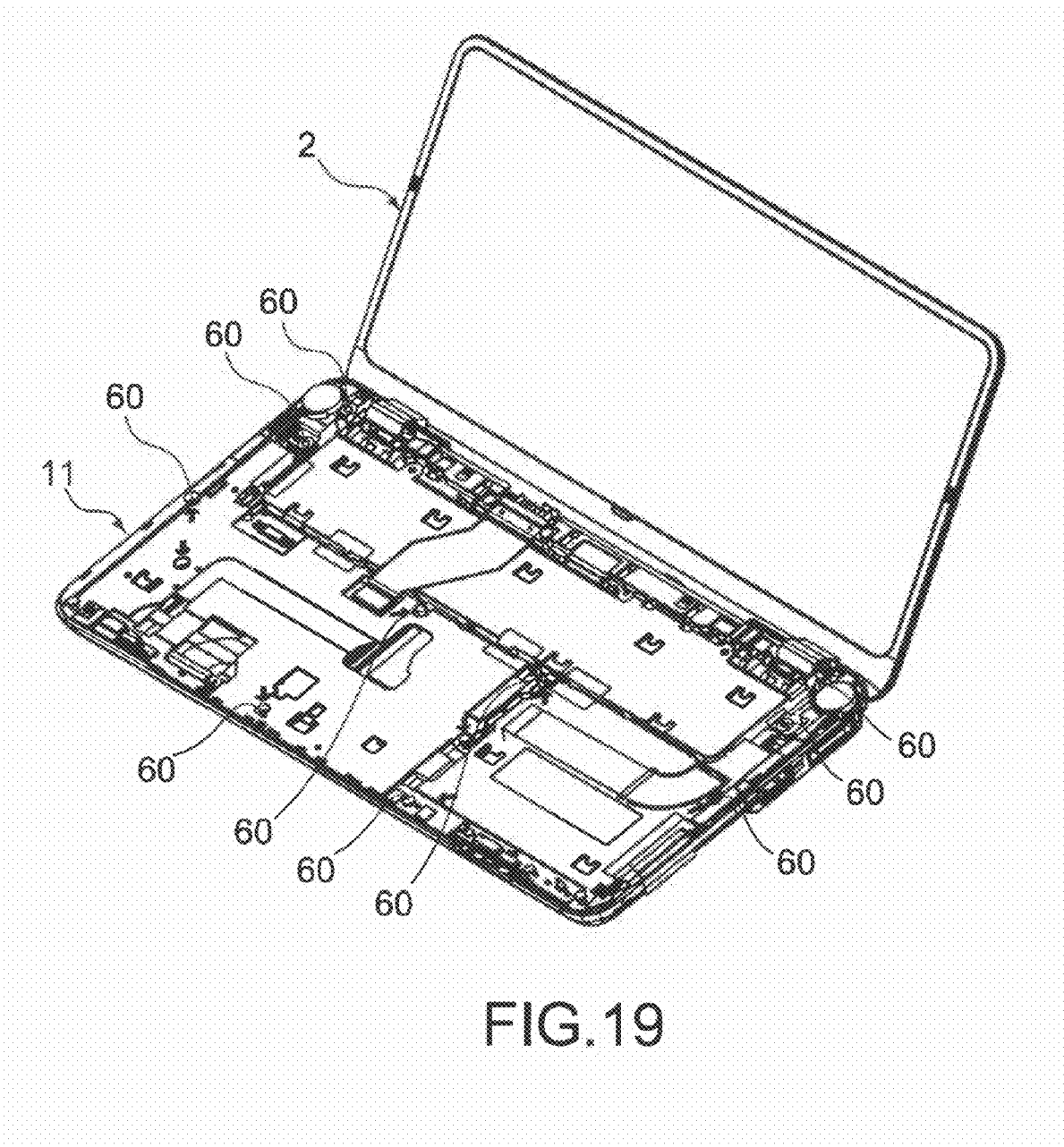
FIG. 19 is a perspective view showing a state in which a display portion is coupled to the main body unit.

Subsequently, as shown in FIG. 18, the bottom 41 is aligned with and overlaid on the frame palm rest 44, and as shown in FIG. 19, screws are inserted into the bosses 60 of the frame palm rest 44 from the frame palm rest 44 side and the frame palm rest 44 and the bottom 41 are screwed (ST1503). In this case, the display portion 2 is coupled to the main body unit 11 as shown in FIG. 19.

Next, as shown in FIG. 3, the weld pins (not shown) of the palm rest 12 are inserted into the holes 17 of the keyboard 13 and then welded (ST1504). Accordingly, the palm rest 12 and the keyboard 13 are welded at a plurality of positions and thus the palm rest unit 10 shown in FIG. 2 is produced.

Then, a process of combining the palm rest unit 10 with the main body unit 11 will be described.

Figure 20:
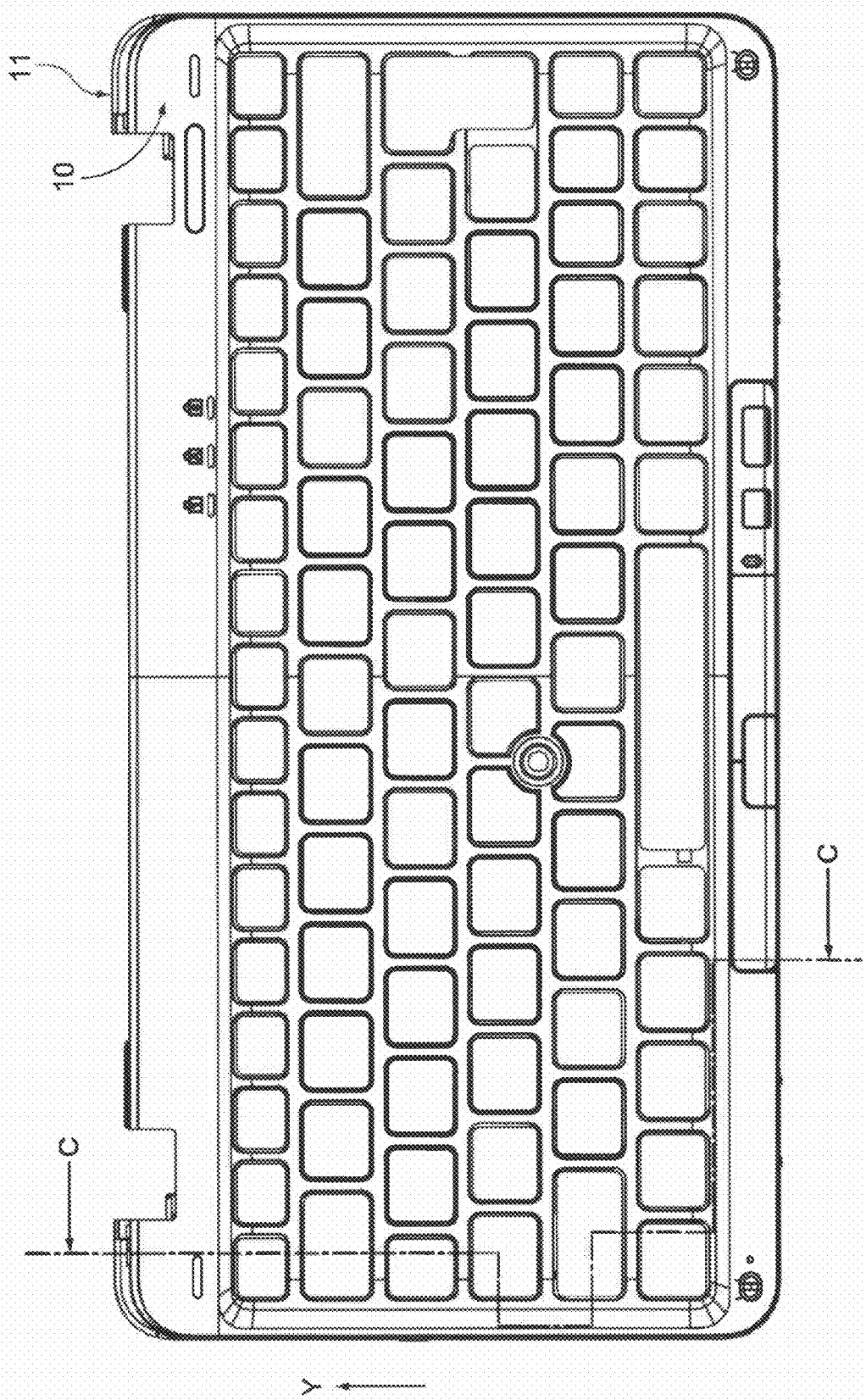
FIG. 20 is a plan view showing a state in which the palm rest unit is overlaid on the main body unit with a slight deviation.
Figure 21:
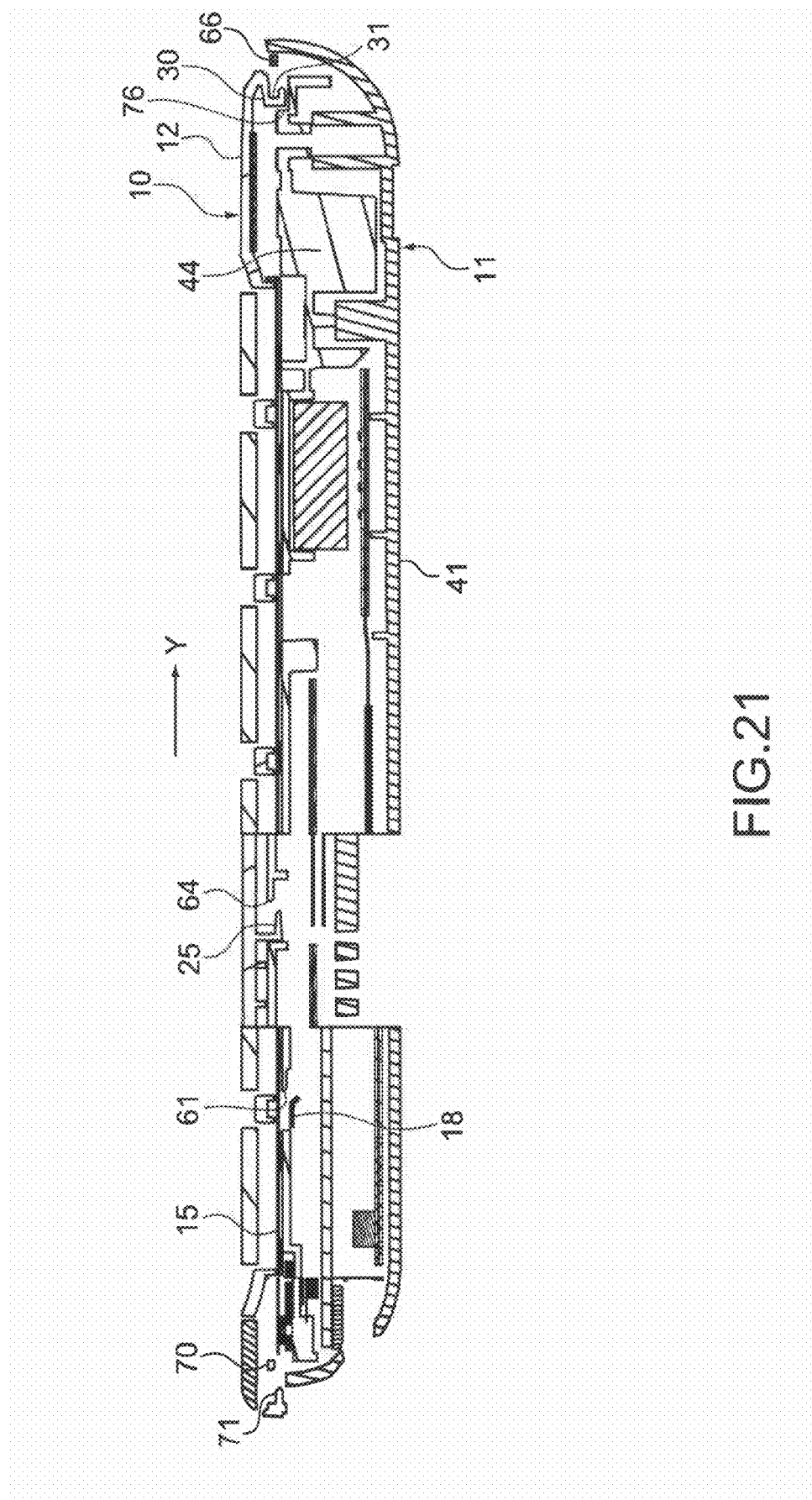
FIG. 21 is a cross-sectional view taken along the line C-C of the palm rest unit and the main body unit shown in FIG. 20.

FIG. 20 is a plan view showing a state in which the palm rest unit 10 is overlaid on the main body unit 11 with a slight deviation and FIG. 21 is a cross-sectional view taken along the line C-C of the palm rest unit 10 and the main body unit 11 shown in FIG. 20. It should be noted that illustration of the hinges 4 is omitted in FIG. 20 and the subsequent figures.

First, as shown in FIG. 20, the palm rest unit 10 is overlaid on the main body unit 11 with a slight deviation (ST1505). That is, the main body unit 11 and the palm rest unit 10 overlap each other with a slight deviation in a direction orthogonal to the longitudinal direction of the palm rest unit 10 (Y direction in FIG. 20).

In this case, as shown in FIG. 21, the engagement portion 30 of the palm rest 12 is not engaged with the engagement claw 66 of the frame palm rest 44. That is, the engagement portion 30 is aligned with a step portion 76 of the frame palm rest 44. Further, the engagement portion 25 of the palm rest 12 is inserted but not fit into the engagement hole 64 of the frame palm rest 44. Furthermore, the engagement protrusion 70 of the palm rest 12 is not fit into the engagement claw 71 of the frame palm rest 44. Moreover, the engagement protrusion 18 of the support plate 15 is inserted but not fit into the engagement hole 61 of the frame palm rest 44.

Figure 22:
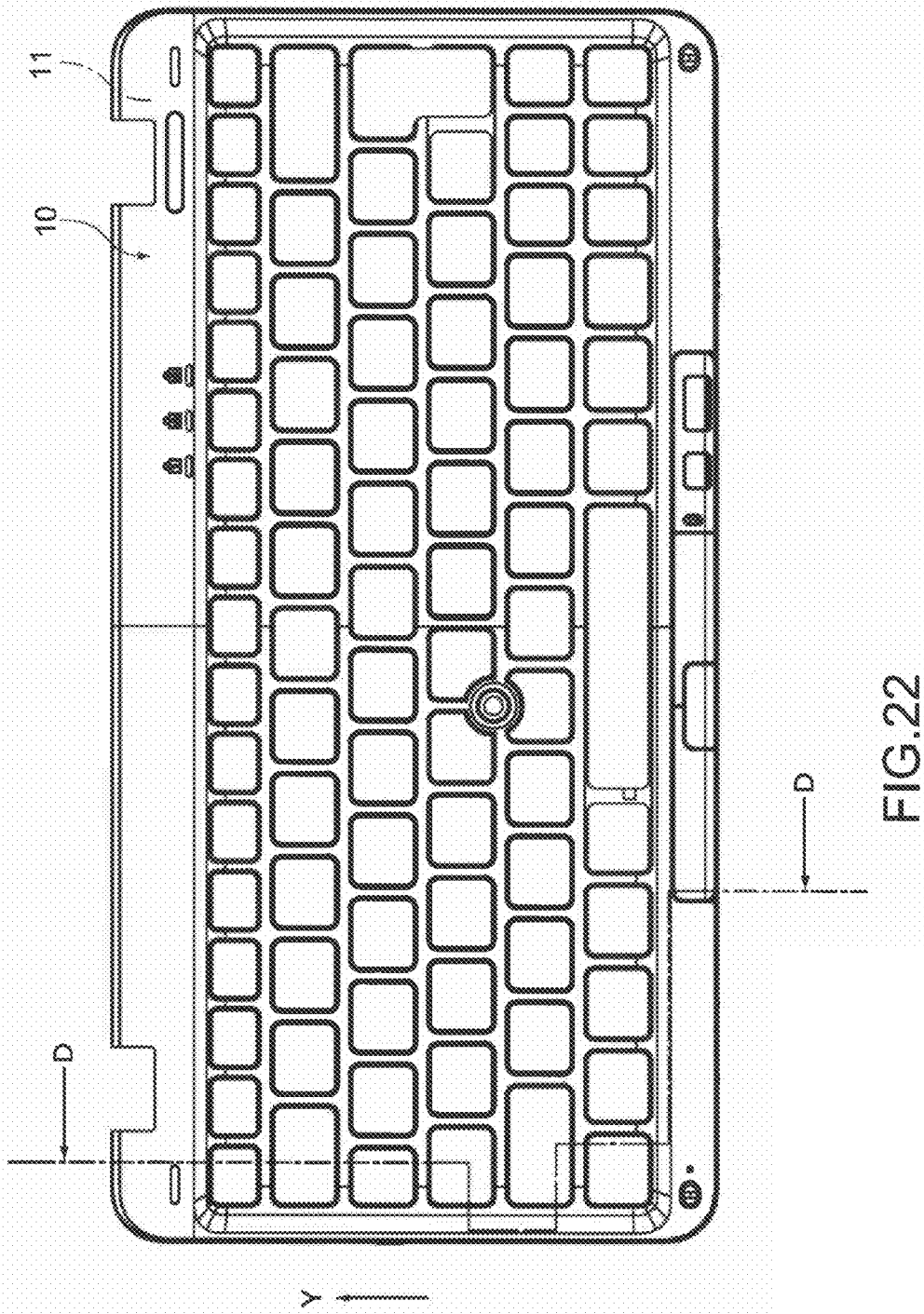
FIG. 22 is a plan view showing a state in which the palm rest unit is caused to slide with respect to the main body unit to be combined therewith.
Figure 23:
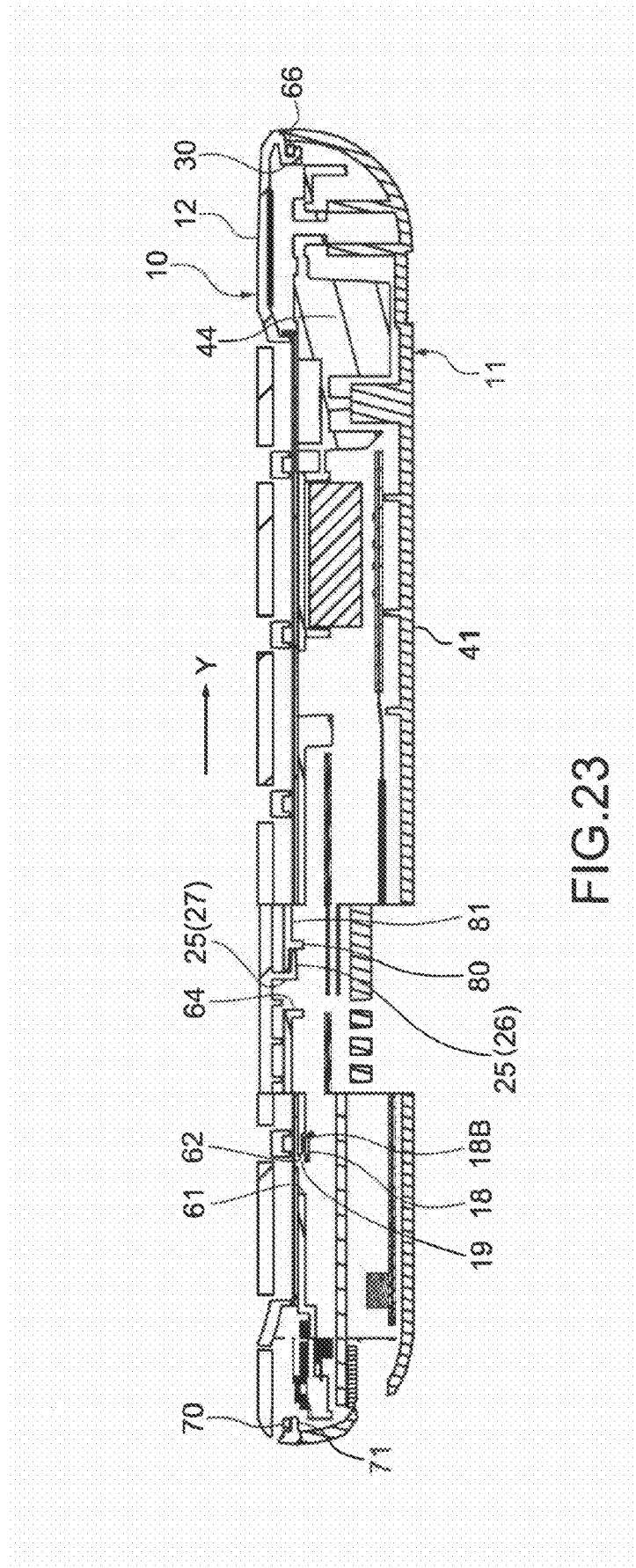
FIG. 23 a cross-sectional view taken along the line D-D of the palm rest unit and the main body unit shown in FIG. 22.

FIG. 22 is a plan view showing a state in which the palm rest unit 10 is caused to slide with respect to the main body unit 11 to be combined therewith and FIG. 23 is a cross-sectional view taken along the line D-D of the palm rest unit 10 and the main body unit 11 shown in FIG. 22.

Then, as shown in FIG. 20, the palm rest unit 10 is caused to slide in the Y direction with respect to the main body unit 11, and thus the main body unit 11 and the palm rest unit 10 are combined (ST1506).

As a result, as shown in FIG. 23, the engagement portion 30 of the palm rest 12 is engaged with the engagement claw 66 of the frame palm rest 44. Further, the engagement portion 25 of the palm rest 12 is engaged with the engagement hole 64 of the frame palm rest 44. Specifically, the first wall portion 26 is overlaid on the frame palm rest 44 and abuts on a protrusion 80. The second wall portion 27 abuts on an end portion that forms the engagement hole 64 of the frame palm rest 44. The protrusion 80 is a protrusion formed so as to protrude from a surface 81 of the frame palm rest 44 on a side opposed to the bottom 41. Furthermore, the claw portion 62 is fit into the engagement hole 19 of the engagement protrusion 18. When the palm rest unit 10 is caused to slide with respect to the main body unit 11, the claw portion 62 is reliably guided to the engagement hole 19 by the overhang 18B.

(Action Etc.)

According to this embodiment as described above, the main body portion 3 of the electronic apparatus 1 includes the frame palm rest 44 capable of mounting the printed board 42 and the heat dissipation unit 43. Screws are screwed into the bosses 60 of the frame palm rest 44 from the frame palm rest 44 side and thus the frame palm rest 44 and the bottom 41 are integrated by the screws.

Accordingly, since it is unnecessary to fix the printed board 42 and the heat dissipation unit 43 to the bottom 41, it is also unnecessary to form a boss, a rib, or the like on the bottom 41. Thus, on the inner surface 46 of the bottom 41, there are not formed the bosses 47, screw holes, ribs, and the like except the circumferences of the bottom 41. As a result, the exterior surface 45 of the bottom 41 is excellent in design because sinks or the like are not formed at the molding, compared with the case of a bottom having a boss, a rib, and the like.

The frame palm rest 44 has substantially the same size as that of the bottom 41 and, for example, magnesium is used for a constituent material of the frame palm rest 44, with the result that the strength of the main body portion 3 can reliably be secured. In particular, the strength or the like against twist or distortion of the main body portion 3 can be improved.

Formed on the bottom surface of the support plate 15 of the palm rest unit 10 are the plurality of engagement protrusions 16 and 18 while being dispersed as shown in FIG. 4. Further, the plurality of engagement portions 25 are formed on the inner surface of the side wall 12A of the palm rest 12 as shown in FIG. 4 and the plurality of engagement portions 28 are formed on the inner surface of the side wall 12B of the palm rest 12. Moreover, the plurality of engagement portions 30 are formed on the side wall 12C of the palm rest 12. Further, the engagement protrusion 70 is formed on the side wall 12D of the palm rest 12 (see FIG. 14).

On the other hand, formed on the surface of the frame palm rest 44 are the engagement holes 61 as shown in FIG. 9. The plurality of engagement holes 64 are formed at one side end portion 44A of the frame palm rest 44 as shown in FIG. 11. The plurality of engagement holes 65 are formed at the other end portion 44B of the frame palm rest 44 as shown in FIG. 12. The engagement claws 66 are formed on the frame palm rest 44 as shown in FIG. 13. Further, at an edge side opposite to the side of the frame palm rest 44, on which the engagement claws 66 are formed, the engagement claw 71 is formed as shown in FIG. 14.

With this structure, when the palm rest unit 10 is caused to slide with respect to the main body unit 11 in the Y direction and is combined therewith as shown in FIG. 23, the engagement protrusions 16 and 18 are fit into the engagement holes 61 and the plurality of engagement portions 25 and 28 are fit into the engagement holes 64 and the like. Further, the engagement claws 66 are fit into the plurality of engagement portions 30 and the engagement protrusion 70 is fit into the engagement claw 71. Accordingly, the palm rest unit 10 and the main body unit 11 can be combined and integrated without using screws or the like, with the result that the main body portion 3 excellent in design can be realized without screws etc. being exposed form the surface side and the back surface side of the main body portion 3.

Further, the number of screws that have been used for combining a main body unit and a palm rest unit from the past can be reduced. Specifically, though 74 screws have been used in the past, the number of screws can be reduced to 52 in this embodiment.

Furthermore, the plurality of engagement protrusions 16 and 18 that are formed on the bottom surface of the support plate 15 of the palm rest unit 10 are fit into the plurality of engagement holes 61 of the frame palm rest 44 and connected thereto while being hooked at the plurality of distributed positions. As a result, it is possible to prevent the keyboard 13 from floating and improve feeling of a user on the keyboard.

The heat dissipation unit 43 includes a heat pipe but does not include a heat dissipation fan, for example. As a result, the size and thickness of the heat dissipation unit 43 can be reduced, with the result that the main body portion 3 can be downsized and thinned.

As shown in FIG. 14, the heat dissipation unit 43 is brought into contact with the electronic component 73 and the frame palm rest 44. Accordingly, the heat generated by the electronic component 73 and the like is dissipated by the heat dissipation unit 43 and also dissipated to a wider range by the frame palm rest 44. As a result, it is possible to efficiently dissipate the heat generated in the electronic component 73 and the like and cool the inside of the main body portion 3.

The engagement protrusion 18 of the support plate 15 of the palm rest unit 10 includes the overhang 18B.

Accordingly, when the palm rest unit 10 is overlaid on the main body unit 11 with a slight deviation as shown in FIGS. 20 and 21, there may be a case where the engagement protrusion 18 is not inserted into the engagement hole 61 of the frame palm rest 44. However, in this case, the overhang 18B is lifted on the surface of the frame palm rest 44. As a result, an operator can easily know that the palm rest unit 10 is not aligned with the main body unit 11 at a predetermined position, with the result that it is possible to combine the palm rest unit 10 and the main body unit 11 more reliably and improve the productivity.

In the embodiment described above, the example in which the main body unit 11 and the palm rest unit 10 are combined by causing the palm rest unit 10 to slide with respect to the main body unit 11 has been described. However, a method of combining the main body unit 11 and the palm rest unit 10 is not limited to the above.

Modified Example

Figure 24:
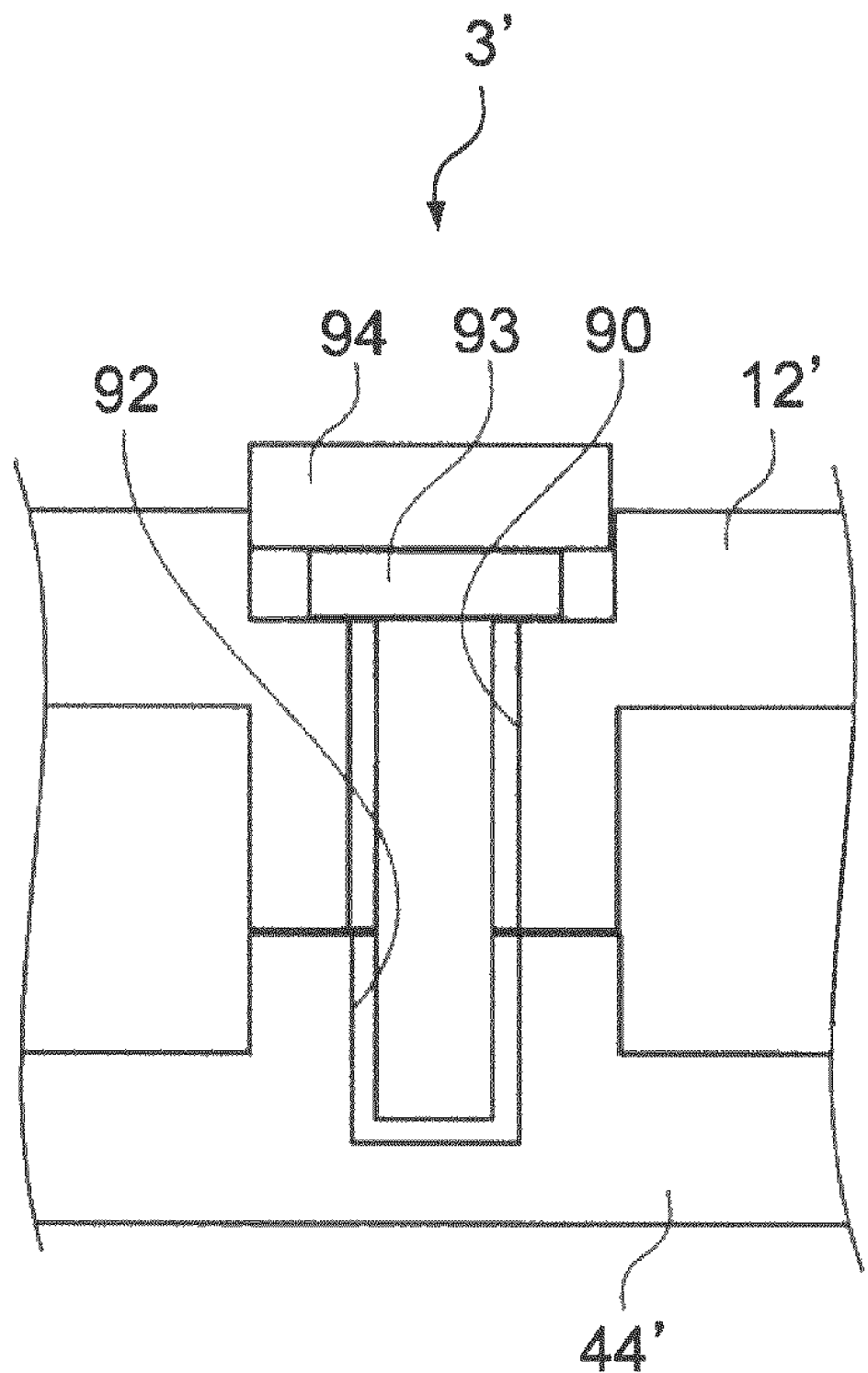
FIG. 24 is a cross-sectional view of the vicinity of a screwing portion of a main body portion of an electronic apparatus in a modified example.

FIG. 24 is a cross-sectional view of the vicinity of a screwing portion of a main body portion of an electronic apparatus in a modified example. It should be noted that in this modified example, constituent members similar to those in the embodiment described above are denoted by the same reference symbols and descriptions thereof are omitted, and different parts will be mainly described.

Unlike the embodiment described above, the electronic apparatus in this modified example does not include the engagement protrusions 16 and the engagement holes 61 that are necessary to combine a main body unit and a palm rest unit by slide, and is different in that a palm rest 12' and a frame palm rest 44' are screwed at four corners.

That is, screw holes 90 are formed at the four corners or the like of the palm rest 12' and screw holes 92 are formed at positions of the frame palm rest 44', which correspond to the positions of the screw holes 90. The palm rest unit and the main body unit overlap each other and thus screws 93 are screwed into the screw holes 90 and 92 from the screw hole 90 side. An upper end of each of the screws 93 is positioned at a deeper position of the screw hole 90 than a surface of the palm rest 12'. A cushion member 94 is buried in the screw hole 90. The cushion member 94 is a blindfold member for blindfolding the screw hole 90 and is a shock-absorbing member for absorbing a shock generated when a display portion is closed with respect to the main body portion.

According to the structure as described above, it is possible to couple the palm rest 12' and the frame palm rest 44' with the screws 93 and absorb, with the cushion members 94, a shock generated when the display portion is closed while blindfolding the screw holes 90. Accordingly, since there can be obtained a state in which the screw holes and the like are not seen from the surface as in the case of the embodiment described above, an electronic apparatus 3' excellent in design can be realized.

The present invention is not limited to the embodiment described above. The present invention can be implemented by being variously modified within the technical idea thereof. The range of the implementation belongs to the technical range of the present invention.

In the embodiment described above, there has been described the example in which the heat dissipation unit 43 and the printed board 42 are mounted onto the frame palm rest 44 and after the frame palm rest 44 is screwed to the bottom 41 (ST1501 to ST1503), the keyboard 13 and the palm rest 12 are welded (ST1504). However, even in a case where the process of ST1504 is performed before the processes of ST1501 to ST1503, the electronic apparatus 1 can be produced similarly.

The shapes of the engagement protrusions 16 and 18 of the palm rest unit 10 and the engagement holes 61 of the frame palm rest 44 are not limited in particular as long as the engagement protrusions 16 and 18 and the engagement holes 61 can be engaged with each other by slide.

The shape of the engagement holes 64 is not limited in particular as long as it allows engagement with the engagement portions 25, and can be changed as appropriate. Further, the number of the engagement holes 64 can also be changed in accordance with the size of the frame palm rest 44. The shape of the engagement holes 65 is not limited in particular as long as it allows engagement with the engagement portions 28, and can be changed as appropriate. For example, the engagement holes 65 may be different in shape. Even with the structure described above, the palm rest unit 10 and the main body unit 11 can be combined as in the case of the embodiment described above.

The present application contains subject matter related to that disclosed in Japanese Priority Patent Application JP 2008-325762 filed in the Japan Patent Office on Dec. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   an accommodation plate to accommodate a plurality of components except at least a keyboard component;
   a first exterior member to hold the keyboard component and constitute a first exterior surface of the electronic apparatus;
   a second exterior member to constitute a second exterior surface as an opposite surface of the first exterior surface; and
   a support plate disposed on a bottom side of the keyboard component, the support plate opposed to the accommodation plate,
   wherein the accommodation plate is disposed between the first exterior member and the second exterior member,
   the support plate includes a first engagement portion, the first engagement portion having a first surface opposed to the first exterior member,
   the accommodation plate includes a second engagement portion, the second engagement portion having a second surface opposed to the second exterior member, and
   the first surface faces the second surface upon engagement of the first engagement portion with the second engagement portion when the support plate is caused to slide along the accommodation plate;
   the first engagement portion includes a protrusion having a flattened, substantially U-shape and an overhanging portion extending from the protrusion;
   the first surface is disposed on a side of the protrusion;
   the second engagement portion includes a claw portion protruding from an edge of a hole through the accommodation plate;
   the second surface is disposed on a side of the claw portion, and
   the claw portion is disposed between the first engagement portion and the support plate when the first engagement portion is engaged with the second engagement portion.

2. The electronic apparatus according to claim 1, wherein the accommodation plate has a planar shape corresponding to the first exterior member.

3. The electronic apparatus according to claim 2, further comprising:
   a first hole that is provided to the first exterior member and connects to the accommodation plate;
   a second hole that is provided to the accommodation plate and corresponds to the first hole;
   a screw that is inserted into the first hole and the second hole from the first hole side and is screwed with a head end being positioned at a deeper position than an end of the first hole so that the first exterior member and the accommodation plate are coupled to each other; and
   a blindfold member that is buried between the end of the first hole and the head end of the screw.

4. The electronic apparatus according to claim 1, wherein the accommodation plate has a bending rigidity higher than that of each of the first exterior member and the second exterior member.

5. The electronic apparatus according to claim 1, wherein the accommodation plate is formed of a magnesium alloy.

6. The electronic apparatus according to claim 1, wherein the plurality of components include a heat-generating component,
   the electronic apparatus further comprising:
   a heat dissipation mechanism including a heat transfer component that is brought into contact with the heat-generating component and the accommodation plate.

7. The electronic apparatus according to claim 1, wherein the protrusion spans a hole through the support plate.

8. The electronic apparatus according to claim 1, wherein the first exterior member includes a third engagement portion, the third engagement portion having a third surface facing away from the accommodation plate, the accommodation plate includes a fourth engagement portion, the fourth engagement portion having a fourth surface opposed to the second exterior member, and the third surface faces the fourth surface upon engagement of the third engagement portion with the fourth engagement portion when the first exterior member is caused to slide along the accommodation plate.

9. The electronic apparatus according to claim 8, wherein the third engagement portion includes a first wall portion protruding from an inner surface of the first exterior member, the third surface disposed on a side of the first wall portion.

10. The electronic apparatus according to claim 9, wherein the third engagement portion includes a second wall portion protruding from an inner surface of the first exterior member, such that the second wall portion is orthogonally continuous with the first wall portion.

11. The electronic apparatus according to claim 8, wherein the fourth engagement portion includes a protrusion extending from a surface of the accommodation plate, the fourth surface disposed on a side of the protrusion.

12. The electronic apparatus according to claim 1, wherein the keyboard is welded to the first exterior member.

13. A method of producing an electronic apparatus, comprising:

incorporating a plurality of components except at least a keyboard component in an accommodation plate;

preparing a first exterior member that constitutes a first exterior surface of the electronic apparatus and a second exterior member that constitutes a second exterior surface as an opposite surface of the first exterior surface;

coupling the accommodation plate, in which the plurality of components are incorporated, and the second exterior member to each other;

incorporating the keyboard component in the first exterior member, such that a support plate is disposed on a bottom side of the keyboard component, the bottom side of the keyboard component facing away from the first exterior member; and sliding the support plate along the accommodation plate such that a first engagement portion of the support plate engages with a second engagement portion of the accommodation plate, thereby coupling the first exterior member and the second exterior member to each other with the accommodation plate being disposed between the first exterior member and the second exterior member, wherein the first engagement portion has a first surface opposed to the first exterior member, the second engagement portion has a second surface opposed to the second exterior member, the first surface faces the second surface upon engagement of the first engagement portion with the second engagement portion;

the first engagement portion includes a protrusion having a flattened, substantially U-shape and an overhanging portion extending from the protrusion;

the first surface is disposed on a side of the protrusion;

the second engagement portion includes a claw portion protruding from an edge of a hole through the accommodation plate, the second surface is disposed on a side of the claw portion, and the claw portion is disposed between the first engagement portion and the support plate when the first engagement portion is engaged with the second engagement portion.

* * * * *